(12) United States Patent
Li et al.

(10) Patent No.: US 8,744,888 B2
(45) Date of Patent: Jun. 3, 2014

(54) RESOURCE ALLOCATION MANAGEMENT

(75) Inventors: Wen-Syan Li, Shanghai (CN); Jie Qi, Shanghai (CN)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/439,368

(22) Filed: Apr. 4, 2012

(65) Prior Publication Data
US 2013/0268307 A1 Oct. 10, 2013

(51) Int. Cl.
G06Q 10/00 (2012.01)
G06Q 40/00 (2012.01)

(52) U.S. Cl.
USPC .......... 705/7.12; 705/7.11; 705/35; 705/36 R; 706/13; 706/14

(58) Field of Classification Search
USPC ............. 705/35, 36 R, 7.11, 7.12; 706/13, 14
See application file for complete search history.

(56) References Cited

U.S. PATENT DOCUMENTS

| | | | | |
|---|---|---|---|---|
| 5,644,727 | A * | 7/1997 | Atkins | 705/40 |
| 5,852,811 | A * | 12/1998 | Atkins | 705/36 R |
| 6,321,205 | B1 * | 11/2001 | Eder | 705/7.37 |
| 6,393,406 | B1 * | 5/2002 | Eder | 705/7.37 |
| 7,580,848 | B2 * | 8/2009 | Eder | 705/7.11 |
| 2001/0034628 | A1 * | 10/2001 | Eder | 705/7 |
| 2001/0053991 | A1 * | 12/2001 | Bonabeau | 705/7 |
| 2002/0013754 | A1 * | 1/2002 | Frank et al. | 705/36 |
| 2002/0046143 | A1 * | 4/2002 | Eder | 705/36 |
| 2002/0091605 | A1 * | 7/2002 | Labe et al. | 705/36 |
| 2003/0233304 | A1 * | 12/2003 | Dhurandhar et al. | 705/36 |
| 2004/0044633 | A1 * | 3/2004 | Chen | 706/13 |
| 2007/0136115 | A1 * | 6/2007 | Senturk Doganaksoy et al. | 705/7 |
| 2007/0156555 | A1 * | 7/2007 | Orr | 705/35 |
| 2008/0313065 | A1 * | 12/2008 | Eder | 705/35 |
| 2009/0070275 | A1 * | 3/2009 | Frank et al. | 705/36 T |
| 2010/0076908 | A1 * | 3/2010 | Frank | 705/36 T |
| 2010/0228685 | A1 * | 9/2010 | Barsade et al. | 705/36 R |
| 2010/0318495 | A1 * | 12/2010 | Yan et al. | 707/618 |
| 2010/0318559 | A1 * | 12/2010 | Yan et al. | 707/769 |

(Continued)

FOREIGN PATENT DOCUMENTS

WO 2008087162 A1 7/2008

OTHER PUBLICATIONS

Land, "An Automatic Method of Solving Discrete Programming Problems", Econometrica, vol. 28, No. 3, Jul. 1960, pp. 497-520.

(Continued)

Primary Examiner — Kenneth Bartley
(74) Attorney, Agent, or Firm — Brake Hughes Bellermann LLP

(57) ABSTRACT

In accordance with aspects of the disclosure, a system and methods are provided for managing resource allocation by generating a finance-investment plan relative to one or more time intervals while maintaining a cash reserve at a predetermined threshold based on information related to financial activities including asset related activities and liability related activities. The systems and methods may include evaluating accounts receivable patterns for each asset to determine cash surplus ranges within the one or more time intervals, evaluating accounts payable patterns for each liability to determine cash flow gaps within the one or more time intervals, maintaining an asset-to-liability ratio during the one or more time intervals, and generating the finance-investment plan while maintaining the cash reserve at the predetermined threshold within the one or more time intervals based on the asset-to-liability ratio and potential cash flow forecasting schemes for each asset and liability.

20 Claims, 12 Drawing Sheets

(56) References Cited

U.S. PATENT DOCUMENTS

2010/0325281 A1* 12/2010 Li et al. .................. 709/226
2011/0282806 A1* 11/2011 Wilcox .................. 705/36 T
2012/0053970 A1* 3/2012 Bhamidipaty et al. ....... 705/7.11
2012/0053973 A1* 3/2012 Elazouni et al. ............ 705/7.12
2013/0006988 A1* 1/2013 Li et al. .................. 707/737
2013/0066455 A1* 3/2013 Li et al. .................. 700/100
2013/0066774 A1* 3/2013 Li et al. .................. 705/40

OTHER PUBLICATIONS

Aulbach, "Multi-tenant databases for software as a service: Schemamapping Techniques", in Proc. of the ACM SIGMOD Int'l Conference on Management of Data, Jun. 9-12, 2008, 12 pages.

Graham, et al, "Bounds for certain multiprocessing anomalies", Bell Systems Technical Journal, vol. XLV, No. 9, Nov. 1966, pp. 1563-1581.

Azar, et al, "On-line load balancing of temporary tasks", Journal of Algorithms, vol. 22, No. 1, 1993, 16 pages.

Hamilton, "On designing and deploying internet-scale services", In Proc. of the 21tst Large Installation System Administration Conference (LISA '07), 2007, 12 pages.

Wustenhoff, "Service level agreement in the Data Center", Sun Microsystems, Inc., Apr. 2002, 12 pages.

Goffe, et al, "Global optimization of statistical functions with simulated annealing", University of Texas Center for High Performance Computing, May 1993, 40 pages.

Phan, et al, "Request-Routing Framework for SOA-based Enterprise Computing", in Proceedings of the International Conference on Very Large Data Bases, Aug. 24-30, 2008, 12 pages.

Hart, et al, "A Formal Basis for the Heuristic Determination of Minimum Cost Paths", IEEE Transactions on Systems Science and Cybernetics, vol. SSC-4, No. 2, Jul. 1968, pp. 100-107.

Phan, et al, "Load distribution of analytical query workloads for database cluster architectures", in Proceedings of the International Conference on Extended Database Technology, Mar. 25-30, 2008, 12 pages.

Oliveira, et al, "Benchmark testing of simulated annealing, adaptive random search and genetic algorithms for the global optimization of bioprocesses", in International Conference on Adaptive and Natural Computing Algorithms, 2005, p. 292.

Russell, et al, "Artificial Intelligence (A Modern Approach)", Prentice Hall, Chapter 3, Exercises 3.1-3.21, 1995, pp. 87-91.

Li, et al, "Placement of Multi-Tenant Database Applications for SaaS", SAP Research Center, China, 2009, 12 pages.

Yang, et al, "A Scalable Data Platform for a Large Number of Small Applications", 4th Biennial Conference on Innovative Data Systems Research (CIDR), Jan. 4-7, 2009, 10 pages.

Plattner, et al, "DBFarm: A Scalable Cluster for Multiple Databases", LNCS vol. 4290, 2006, pp. 180-200.

Extended EP Search Report for EP Application No. 10006450.0, mailed Oct. 14, 2010, 10 pages.

Phan, et al, "Heuristics-Based Scheduling of Composite Web Service Workloads", MW4SOC '06, Nov. 27-Dec. 1, 2006, 6 pages.

* cited by examiner

600
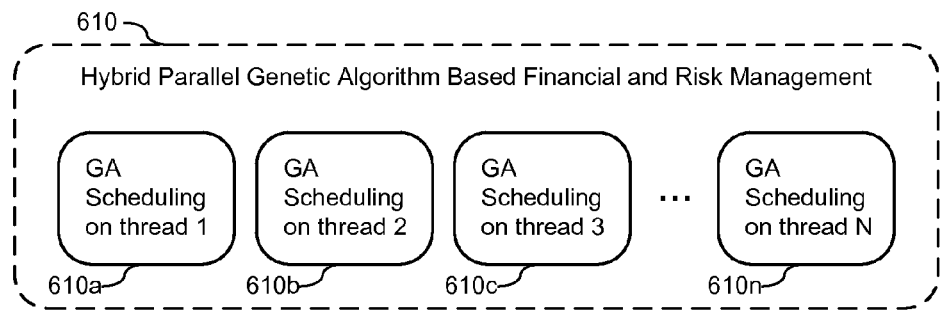
GA Based Finance-Investment Planning Process
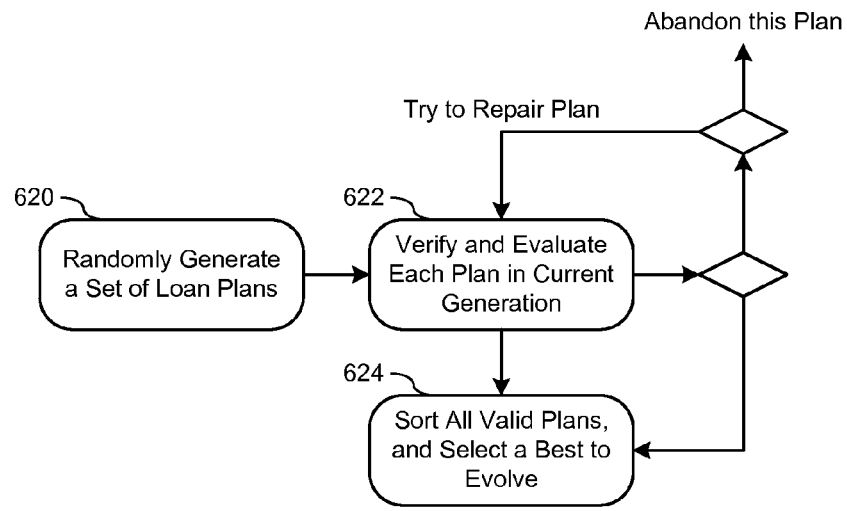
FIG. 6

900

Chromosome Presentation for Loan Method

| | Day1 | Day2 | Day3 | Day4 | Day5 | Day6 | Day7 | Day8 |
|---|---|---|---|---|---|---|---|---|
| daysInPeriod | 1 | 2 | 3 | 4 | 5 | 6 | 7 | 8 |
| ifTakeLoan | TRUE | FALSE | FALSE | TRUE | FALSE | TRUE | FALSE | FALSE |
| nameOfLoan | Bank1 Loan1 | NULL | NULL | Bank2 Loan1 | NULL | Bank3 Loan2 | NULL | NULL |
| amountOfLoan | 10000 | 0 | 0 | 20000 | 0 | 15000 | 0 | 0 |

Chromosome Presentation for Investment Method

| | Day1 | Day2 | Day3 | Day4 | Day5 | Day6 | Day7 | Day8 |
|---|---|---|---|---|---|---|---|---|
| daysInPeriod | 1 | 2 | 3 | 4 | 5 | 6 | 7 | 8 |
| ifInvest | TRUE | TRUE | TRUE | FALSE | FALSE | TRUE | FALSE | TRUE |
| nameOfInvest | Asset1 | Asset3 | Asset2 | NULL | NULL | Asset1 | NULL | Asset5 |
| amountOfInvest | 50000 | 20500 | 20500 | 0 | 0 | 80000 | 0 | 40000 |

Chromosome Presentation for Integrated Method

| | Day1 | Day2 | Day3 | Day4 | Day5 | Day6 | Day7 | Day8 |
|---|---|---|---|---|---|---|---|---|
| daysInPeriod | 1 | 2 | 3 | 4 | 5 | 6 | 7 | 8 |
| ifTake | FALSE | TRUE | TRUE | FALSE | FALSE | TRUE | FALSE | TRUE |
| nameOfActivity | NULL | Invest2 | Bank1 Loan3 | NULL | NULL | Bank2 Loan1 | NULL | Invest5 |
| amountOfCash | 0 | 20500 | 20500 | 0 | 0 | 80000 | 0 | 40000 |

FIG. 11

RESOURCE ALLOCATION MANAGEMENT

TECHNICAL FIELD

The present description relates to computer-based techniques for resource allocation management.

BACKGROUND

Sometimes, credit crunching in capital markets may involve a reduction in availability of bank mortgage loans. Some companies may lack options for short-term financing sources and an effective approach to managing investments to support regular business operations. For some entrepreneurs and managers of small and medium sized enterprises, cash flow and risk management are increasingly important.

Generally, businesses need to maintain a certain level of cash reserve as working capital. In some cases, if the working capital reserve level is too high, it may not be cost efficient. On the other hand, businesses may be at risk and may fail to operate consistently if the working capital reserve level is too low. As such, there exists a need to manage the allocation of resources and risk while maintaining cash reserves levels in an efficient manner so as to maximize profits.

SUMMARY

In accordance with aspects of the disclosure, a computer system may be provided for resource allocation management including instructions recorded on a computer-readable medium and executable by at least one processor. The computer system may include a resource allocation manager configured to cause the at least one processor to generate a finance-investment plan relative to one or more time intervals while maintaining a cash reserve at a predetermined threshold based on information related to one or more financial activities including asset related activities and liability related activities. The resource allocation manager may include an asset handler configured to retrieve information related to one or more assets from an asset database and evaluate accounts receivable patterns for each asset to determine cash surplus ranges within the one or more time intervals. The resource allocation manager may include a liability handler configured to retrieve information related to one or more liabilities from a liability database and evaluate accounts payable patterns for each liability to determine cash flow gaps within the one or more time intervals. The resource allocation manager may include a risk handler configured to maintain an asset-to-liability ratio during the one or more time intervals. The resource allocation manager may include a genetic algorithm handler configured to generate one or more potential cash flow forecasting schemes for each asset and liability based on the accounts receivable patterns for each asset and the accounts payable patterns for each liability while maintaining the cash reserve at the predetermined threshold. The resource allocation manager may include a financial activity optimizer configured to generate the finance-investment plan while maintaining the cash reserve at the predetermined threshold within the one or more time intervals based on the asset-to-liability ratio and the one or more potential cash flow forecasting schemes for each asset and liability.

In accordance with aspects of the disclosure, a computer-implemented method may be provided for resource allocation management. In an implementation, the computer-implemented method may include generating a finance-investment plan relative to one or more time intervals while maintaining a cash reserve at a predetermined threshold based on information related to one or more financial activities including asset related activities and liability related activities by retrieving information related to one or more assets from an asset database and evaluating accounts receivable patterns for each asset to determine cash surplus ranges within the one or more time intervals, retrieving information related to one or more liabilities from a liability database and evaluating accounts payable patterns for each liability to determine cash flow gaps within the one or more time intervals, maintaining an asset-to-liability ratio during the one or more time intervals, generating one or more potential cash flow forecasting schemes for each asset and liability based on the accounts receivable patterns for each asset and the accounts payable patterns for each liability while maintaining the cash reserve at the predetermined threshold, and generating the finance-investment plan while maintaining the cash reserve at the predetermined threshold within the one or more time intervals based on the asset-to-liability ratio and the one or more potential cash flow forecasting schemes for each asset and liability.

In accordance with aspects of the disclosure, a computer program product may be provided, wherein the computer program product is tangibly embodied on a computer-readable storage medium and includes instructions that, when executed by at least one processor, are configured to generate a finance-investment plan relative to one or more time intervals while maintaining a cash reserve at a predetermined threshold based on information related to one or more financial activities including asset related activities and liability related activities. The computer program product may include instructions that, when executed by the processor, are configured to retrieve information related to one or more assets from an asset database and evaluating accounts receivable patterns for each asset to determine cash surplus ranges within the one or more time intervals, retrieve information related to one or more liabilities from a liability database and evaluating accounts payable patterns for each liability to determine cash flow gaps within the one or more time intervals, maintain an asset-to-liability ratio during the one or more time intervals, generate one or more potential cash flow forecasting schemes for each asset and liability based on the accounts receivable patterns for each asset and the accounts payable patterns for each liability while maintaining the cash reserve at the predetermined threshold, and generate the finance-investment plan while maintaining the cash reserve at the predetermined threshold within the one or more time intervals based on the asset-to-liability ratio and the one or more potential cash flow forecasting schemes for each asset and liability.

The details of one or more implementations are set forth in the accompanying drawings and the description below. Other features will be apparent from the description and drawings, and from the claims.

BRIEF DESCRIPTION OF THE DRAWINGS

FIG. 6 is a block diagram illustrating an example of a hybrid parallel genetic algorithm (HPGA) framework for use in resource allocation management.

FIGS. 9-11 are diagrams illustrating various chromosome presentations for finance-investment schemes, in accordance with aspects of the disclosure.

DETAILED DESCRIPTION

Figure 1:
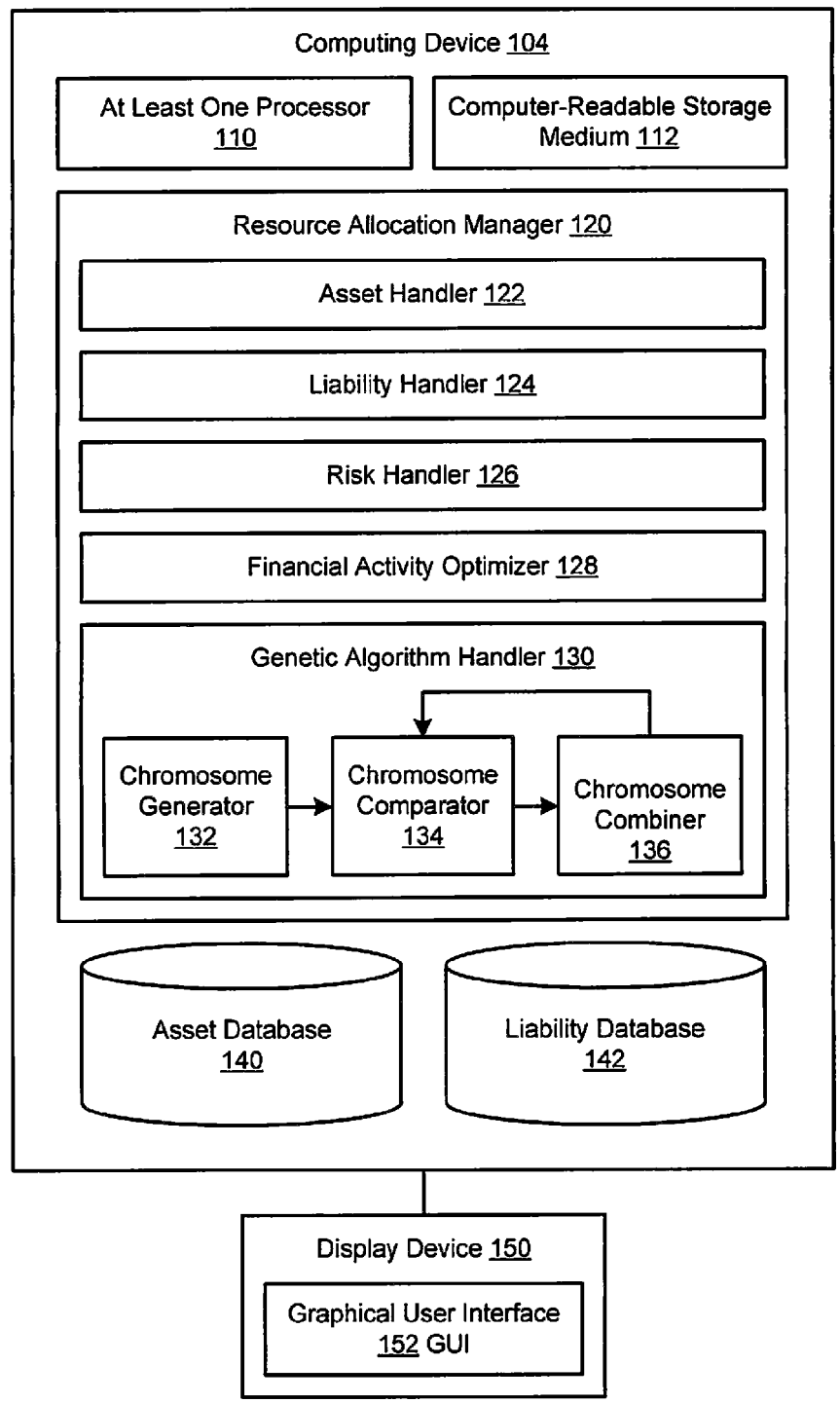
FIG. 1 is a block diagram illustrating an example system for managing resource allocation by implementing a genetic algorithm for finance-investment planning.

FIG. 1 is a block diagram illustrating an example system 100 for managing resource allocation by implementing a genetic algorithm for finance-investment planning.

In the example of FIG. 1, the system 100 comprises a computer system for implementing a resource allocation management system that may be associated with a computing device 104, thereby transforming the computing device 104 into a special purpose machine designed to determine and implement finance-investment planning process(es), as described herein. In this sense, it may be appreciated that the computing device 104 may include any standard element(s) and/or component(s), including at least one processor(s) 110, memory (e.g., non-transitory computer-readable storage medium) 112, power, peripherals, and various other computing elements and/or components that may not be specifically shown in FIG. 1. Further, the system 100 may be associated with a display device 150 (e.g., a monitor or other display) that may be used to provide a graphical user interface (GUI) 152. In an implementation, the GUI 152 may be used, for example, to receive preferences from a user for managing or utilizing the system 100. As such, it should be appreciated that various other elements and/or components of the system 100 that may be useful to implement the system 100 may be added or included, as would be apparent to one of ordinary skill in the art.

In the example of FIG. 1, the resource allocation management system 100 may include the computing device 104 and instructions recorded on the computer-readable medium 112 and executable by the at least one processor 110. The resource allocation management system 100 may include the display device 150 for providing output to a user, and the display device 150 may include the graphical user interface (GUI) 152 for receiving input from the user.

The resource allocation management system 100 may include a resource allocation manager 120 configured to cause the at least one processor 110 to generate a finance-investment plan relative to one or more time intervals while maintaining a cash reserve at a predetermined threshold based on information related to one or more financial activities including asset related activities and liability related activities. The resource allocation manager 120 may be configured to manage, control, and maintain a cash reserve level (i.e., a working capital level) within a desirable range or at least above a desirable level using, for example, a set of rules. In various examples, one or more additional rules may be applied to the resource allocation management system 100 by adding the additional rules to "fitness functions" in a genetic algorithm for finance-investment planning, in a manner as described herein.

In an aspect of the disclosure, the predetermined threshold of the cash reserve refers to a working capital or cash reserve threshold that may be predetermined based on input received from a user. The cash reserve threshold may be adapted to consider a target cash reserve level (TCRL) for indicating when a working capital amount is equal to or at least greater than the target cash reserve level (TCRL). The cash reserve threshold may be adapted to consider a low cash reserve level (LCRL) for indicating when the working capital amount is within a range proximate to the target cash reserve level (TCRL). The cash reserve threshold may be adapted to consider a critical cash reserve level (CCRL) for indicating when the working capital amount is less than the target cash reserve level (TCRL), which may be considered a critically low level. The cash reserve threshold may be adapted to consider an excessive cash reserve level (ECRL) for indicating when the working capital amount is greater than the target cash reserve level (TCRL), which may be considered an excessively high level. These and various other related aspects are described in greater detail herein.

In another aspect of the disclosure, the information related to the one or more financial activities may include data related to the one or more financial activities including historical data and future cash flow forecasting data. For instance, information related to the one or more assets and/or asset related activities may include investment portfolio data related to the one or more assets and/or asset related activities including historical data and future cash flow forecasting data, and each of the assets and/or asset related activities may be related to one or more investments including one or more short-term investments that provide revenue as cash inflow to the cash reserve. In another instance, the information related to the one or more liabilities may include loan portfolio data related to the one or more liabilities and/or liability related activities including historical data and future cash flow forecasting data, and each of the liabilities and/or liability related activities may be related to one or more loans including one or more short-term loans that request payment as cash outflow from the cash reserve. As such, in a manner as provided herein, aspects of the disclosure are related to optimizing short-term financing and investment while managing and/or maintaining risk.

In the example of FIG. 1, the resource allocation manager 120 may include an asset handler 122 configured to retrieve information related to one or more assets from an asset database 140 and evaluate accounts receivable (AR) patterns for each asset to determine cash surplus ranges within the one or more time intervals. The asset handler 122 may be further configured to obtain a plurality of forthcoming accounts receivable from the retrieved information for the one or more assets from the asset database 140.

In an aspect of the disclosure, assets and/or asset related activities for accounts receivable (AR) may refer to revenue, income, and/or cash inflow, such as, for instance, money owed to a business by an investment enterprise, which may be shown on a balance sheet of the business as an asset. For example, when investment revenue is received from an investment enterprise, the revenue may be added to the balance sheet as cash inflow to the cash reserve. As such, assets and/or asset related activities for accounts receivable (AR) may refer to accounting transactions relating to investment activities and receiving a subsequent dividend from the investment enterprise.

In the example of FIG. 1, the resource allocation manager 120 may include a liability handler 124 configured to retrieve information related to one or more liabilities from a liability database 142 and evaluate accounts payable (AP) patterns for each liability to determine cash flow gaps within the one or more time intervals. The liability handler 124 may be further configured to obtain a plurality of forthcoming accounts payable from the retrieved information for the one or more liabilities from the liability database 142.

In an aspect of the disclosure, liabilities and/or liability related activities for accounts payable (AP) may refer to debt, payment, and/or cash outflow, such as, for instance, money owed to a lender by a business, which may be shown on a balance sheet of the business as a liability. For example, when a payment request is received from a lender, the payment request may be added to the balance sheet as cash outflow from the cash reserve. Thus, accounts payable (AP) may be considered as a form of credit, such as a loan, that lenders offer to a business by allowing payment for cash lent to the business or borrowed by the business. As such, in an example, liabilities and/or liability related activities for accounts payable (AP) may refer to accounting transactions relating to paying a lender for borrowed capital (i.e., cash) and providing a subsequent payment to the lender after receiving the borrowed capital (i.e., cash) from the lender.

The resource allocation manager 120 may include a risk handler 126 configured to maintain and/or manage an asset-to-liability ratio during the one or more time intervals. In an implementation, the risk handler 126 may be configured to determine when the asset-to-liability ratio changes and recalculate the asset-to-liability ratio when cash (i.e., working capital) is added from at least one of the assets to the cash reserve (i.e., working capital reserve) as revenue and/or when cash (i.e., working capital) is allocated to at least one of the liabilities from the cash reserve (i.e., working capital reserve) as payment. Risk management, such as maintaining and/or managing the asset-to-liability ratio, should be considered for impacting credit rating of a business, such as in the ability to acquire a desirable loan and interest rate. In various implementation, it should be appreciated that the asset-to-liability ratio may refer to a liability-to-asset ratio, a debt-to-asset ratio, and/or various other similar types of ratios, without departing from the scope of the disclosure. These and various other related aspects are described in greater detail herein.

The resource allocation manager 120 may include a genetic algorithm handler 130 configured to generate one or more potential cash flow forecasting schemes for each asset and liability based on the accounts receivable patterns for each asset and/or the accounts payable patterns for each liability while maintaining the cash reserve at the predetermined threshold.

In an aspect of the disclosure, each of the assets may be related to at least one investment providing revenue as cash inflow to the cash reserve, and each of the potential cash flow forecasting schemes may be generated to determine potential cash surplus ranges for each asset and potential increases in revenue for each asset. In an implementation, the genetic algorithm handler may be configured to generate the one or more potential cash flow forecasting schemes based on using investment portfolio information of each asset to determine the cash surplus ranges within the one or more time intervals while maintaining the cash reserve at the predetermined threshold.

In an aspect of the disclosure, each of the liabilities may be related to at least one loan requesting payment as cash outflow from the cash reserve, and each of the potential cash flow forecasting schemes may be generated to determine potential cash flow gaps for each liability and/or potential loan interest expenses for each liability. In an implementation, the genetic algorithm handler may be configured to generate the one or more potential cash flow forecasting schemes based on using loan portfolio information of each liability to determine the cash flow gaps within the one or more time intervals while maintaining the cash reserve at the predetermined threshold.

The resource allocation manager 120 may include a financial activity optimizer 128 configured to generate the finance-investment plan while maintaining the cash reserve at the predetermined threshold within the one or more time intervals based on the asset-to-liability ratio and/or the one or more potential cash flow forecasting schemes for each asset and liability. The financial activity optimizer 128 may be configured to evaluate each potential cash flow forecasting scheme for each asset and liability and select a best potential cash flow forecasting scheme by considering one or more of the asset-to-liability ratio, the potential cash surplus ranges for each asset, and the potential cash flow gaps for each liability while maintaining the cash reserve at the predetermined threshold.

In the example of FIG. 1, the genetic algorithm handler 130 may include a chromosome generator 132 configured to generate or create the one or more potential cash flow forecasting schemes as one or more financial forecast chromosomes for each asset and liability based on using, in various examples, the accounts receivable patterns for each asset and the accounts payable patterns for each liability.

The genetic algorithm handler 130 may include a chromosome comparator 134 configured to compare a plurality of financial forecast chromosomes, wherein each financial forecast chromosome includes the one or more potential cash flow forecasting schemes for each asset and liability within the one or more time intervals based on the accounts receivable patterns for each asset and/or the accounts payable patterns for each liability. The chromosome comparator 134 may be further configured to compare each of the plurality of financial forecast chromosomes relative to the predetermined threshold of the cash reserve, to thereby output a selected subset of the plurality of financial forecast chromosomes.

The genetic algorithm handler 130 may include a chromosome combiner 136 configured to combine financial forecast chromosomes of the selected subset of the plurality of financial forecast chromosomes to obtain a next generation of financial forecast chromosomes for output to the chromosome comparator 134 and for subsequent comparison therewith of the next generation of financial forecast chromosomes with respect to the predetermined threshold of the cash reserve, as part of an evolutionary loop of the plurality of financial forecast chromosomes between the chromosome comparator 134 and the chromosome combiner 136. In this instance, for example, the financial activity optimizer 128 may be further configured to monitor the evolutionary loop and select a selected financial forecast chromosome therefrom for implementation of the finance-investment plan based thereon.

The financial activity optimizer 128 may be further configured to select the selected financial forecast chromosome after a predetermined number of generations of the evolutionary loop, or after determining that the selected financial forecast chromosome satisfies the predetermined threshold of the cash reserve.

In an implementation, the chromosome combiner 136 may be further configured to combine the financial forecast chromosomes including selecting pairs of financial forecast chromosomes and crossing over portions of each pair of financial forecast chromosomes to obtain a child chromosome of the next generation.

Further, in an implementation, at least a portion of the evolutionary loop is executed using parallel processes in which each generation of financial forecast chromosomes is divided into sub-groups for parallel processing thereof.

In an aspect of the disclosure, the term(s) resource allocation management, working capital management, cash flow management, and various other similar terms may be considered interchangeable. Further, the description(s) of means for managing, controlling, and/or maintaining the cash level, cash reserve level, and/or working capital level within a desirable (or predetermined) range or above a desirable (or predetermined) level using a set of rules should be viewed as an example or implementation, and as such, additional rules may be added to the resource allocation management system 100 and/or components thereof by adding them to one or more "fitness functions" in the finance-investment planning algorithm presented herein. In an implementation, a heuristic search algorithm may be utilized to determine a sub-optimal solution, and a loan and investment opportunity qualification check may be performed within a "fitness function" as well as risk management where many ratios may be calculated and checked for compliance.

In accordance with aspects of the disclosure, there are types of financial activities that may impact daily cash reserve levels. Some examples include asset related activities for accounts receivable (AR) and liability related activities for accounts payable (AP). Asset related activities for accounts receivable (AR) may refer to revenue, income, and/or cash inflow to the cash reserve, and liability related activities for accounts payable (AP) may refer to debt, payment, and/or cash outflow from the cash reserve.

In an aspect of the disclosure, example requirement(s) for resource allocation management provides for maintaining a desirable or predetermined cash reserve level that may be set in a desired or predetermined manner. For instance, the working capital or cash reserve should be maintained above a TCRL. However, the working capital or cash reserve may drop below a LCRL for a particular number of days over a period or a number of consecutive days in a period. However, the working capital or cash reserve should not drop below a CCRL at any time. Since working capital or cash inflow may only be estimated and not controlled, then as accounts receivables are received as revenue, at least one parameter may be configured that refers to a confidence (or risk) level of a cash inflow estimation strategy.

The system 100 may be configured to implement a randomized algorithm approach known as a genetic algorithm (GA), which may refer generally to a computer simulation of Darwinian natural selection that iterates through successive generations to converge toward a best solution in a problem/solution space. Such a genetic algorithm may be used by the system 100 to consider requirements and/or related parameters (e.g., cash reserves) into the finance-investment optimization process. Further, the resource allocation management system 100 is capable of recommending and/or selecting "best-available" finance-investment plans.

In the system 100, the genetic algorithm approach may be implemented, for example, by creating a "chromosome" representing a possible solution to the problem of generating a finance-investment plan for cash flow forecasting. Specific examples of such financial forecast chromosomes are described herein. However, generally speaking, it should be appreciated that such financial forecast chromosomes may include one or more potential cash flow forecasting schemes for each asset and liability based on the accounts receivable patterns for each asset and the accounts payable patterns for each liability while maintaining the cash reserve at the predetermined threshold. Further, it should be appreciated that such potential cash flow forecasting schemes may be used to compare each of the financial forecast chromosomes relative to a predetermined threshold of the cash reserve, to thereby output a selected subset of financial forecast chromosomes. Therefore, there may be a single such financial forecast chromosome that may represent the single best finance-investment solution for a given set of finance-investment objectives to thereby optimize profits. However, optimization of cash flow forecasting schemes (i.e., financial forecast chromosomes) may be relative to needs of a user and various other factors, parameters, and/or requirements. Due to the nature of the genetic algorithms used herein, the resource allocation manager 104 may be configured to find a "best" solution that is close to an optimal solution, even if the actual optimal solution is not identifiable as such.

In this regard, the resource allocation manager 104 may be configured to optimize finance-investment planning relative to one or more objectives. One such metric may include profitability. For example, some investments may be more profitable than others, and/or profitability may be enhanced by exhibiting a preference for behaviors associated with increased profitability. On the other hand, other additional or alternative metrics may have value besides pure profitability. For instance, a gain in market share may be a valuable metric to consider.

As such, in an example, the financial activity optimizer 128 may be configured for tuning preferences to provide designations between possible objectives of the resource allocation manager 104, and it should be appreciated that various factors, parameters, and/or requirements may be considered to be necessary or optional. For instance, in scenarios in which profitability should be optimized, a full utilization of the genetic algorithm may be an option but not a requirement.

The resource allocation manager 120 may be configured to utilize the genetic algorithm via the genetic algorithm handler 130 to create, compare, and combine multiple financial forecast chromosomes in a manner to create a new generation or population of financial forecast chromosomes for evaluation so that a subset thereof may be selected for reproduction and subsequent evaluation. In this way, each generation and/or population of financial forecast chromosomes may tend to converge toward an optimal solution for finance-investment planning. The financial activity optimizer 128 may be configured to select a particular one of the finance-investment solutions (i.e., potential cash flow forecasting schemes or financial forecast chromosomes) for use in finance-investment planning.

In the example of FIG. 1, the genetic algorithm handler 130 may include the chromosome generator 132 configured for generating one or more financial forecast chromosomes. Such financial forecast chromosome generation may occur at random or may include some initial guidelines or restrictions. The chromosome generator 132 may be configured to generate an initial population or set of financial forecast chromosomes, which may be evaluated by the chromosome comparator 134 configured for comparing each financial forecast chromosome including the one or more potential cash flow forecasting schemes for each asset and liability within the one or more time intervals based on the accounts receivable patterns for each asset and the accounts payable patterns for each liability, and configured to compare each of the plurality of financial forecast chromosomes relative to the predetermined threshold of the cash reserve, to thereby output a selected subset of the plurality of financial forecast chromosomes, which may preferably represent the best available cash flow forecasting scheme. These and various other related aspects are described in greater detail herein.

The chromosome combiner 136 may receive the selected subset of the plurality of financial forecast chromosomes and may be configured to combine (e.g., crossover and mutate) financial forecast chromosomes of the selected subset of the plurality of financial forecast chromosomes to obtain a next generation (population) of financial forecast chromosomes for output to the chromosome comparator 134, which may then perform another, subsequent comparison therewith of the next generation of financial forecast chromosomes with consideration of the predetermined threshold of the cash reserve, as part of an evolutionary loop of successive generations of the plurality of financial forecast chromosomes between the chromosome comparator 134 and the chromosome combiner 136. With each successive generation, the new population of financial forecast chromosomes may represent or include possible improved or near-optimal schedule(s). New generations/populations may be iteratively created until either an optimal solution is met, or until factors, preferences, and/or requirements are met up to some predefined satisfactory level or threshold, or until a pre-determined number of generations is calculated, or until time runs out to compute new generations/populations (at which point a best solution of the current generation may be selected).

As referenced above, the financial activity optimizer 128 may be configured to monitor the evolutionary loop and to select a selected financial forecast chromosome therefrom for implementation of the finance-investment plan based thereon. As referenced herein, the selected financial forecast chromosome/solution may represent either a best (optimal or near optimal) solution, or may represent a best-available solution. Thus, the financial activity optimizer 128 may be tasked with determining whether, when, and how to interrupt or otherwise end the evolutionary loop and extract the best, best-available, optimal, or near optimal solution. Then, the financial activity optimizer 128 may output a selected financial forecast chromosome and/or execute an actual finance-investment plan.

In the example of FIG. 1, it should be appreciated that the resource allocation management system 100 is illustrated using various functional blocks or modules that represent more-or-less discrete functionality. However, such illustration is provided for clarity and convenience, and thus, it should be appreciated that the various functionalities may overlap or be combined within a described block(s) or module(s), and/or may be implemented by one or more block(s) or module(s) not specifically illustrated in the example of FIG. 1. Generally, it should be appreciated that conventional functionality that may be considered useful to the system 100 of FIG. 1 may be included as well even though such conventional elements are not illustrated explicitly, for the sake of clarity and convenience.

Figure 2:
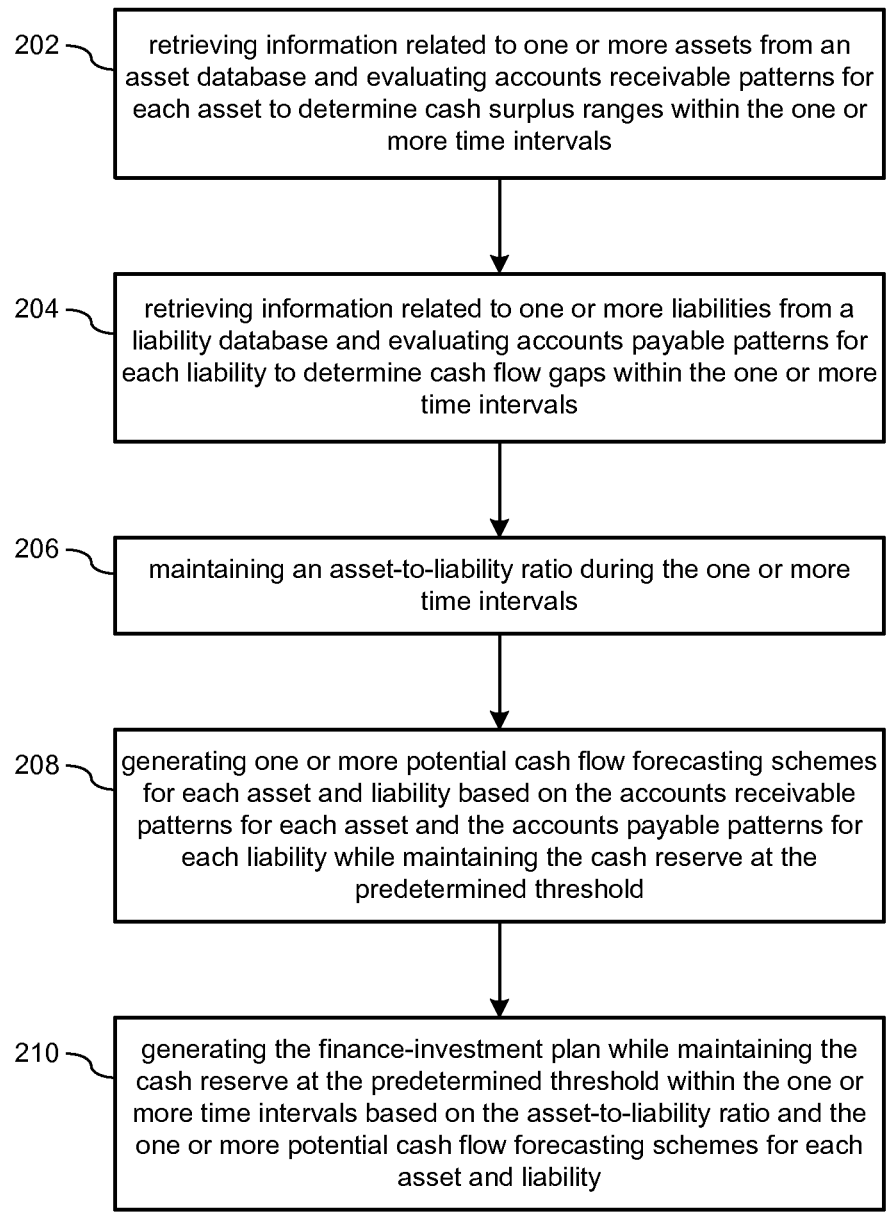
FIG. 2 is a process flow illustrating an example method for managing resource allocation by implementing a genetic algorithm for finance-investment planning.

FIG. 2 is a process flow illustrating an example method 200 for managing resource allocation by implementing a genetic algorithm for finance-investment planning.

In the example of FIG. 2, operations 202-210 are illustrated as discrete operations occurring in sequential order. However, it should be appreciated that, in other implementations, two or more of the operations 202-210 may occur in a partially or completely overlapping or parallel manner, or in a nested or looped manner, or may occur in a different order than that shown. Further, additional operations, that may not be specifically illustrated in the example of FIG. 2, may also be included in some implementations, while, in other implementations, one or more of the operations 202-210 may be omitted. Further, the method 200 may include a process flow for a computer-implemented method for managing resource allocation in the resource allocation management system 100 of FIG. 1. Further, as described herein, the operations 202-210 may provide a simplified operational process flow that may be enacted by the computer system 104 to provide features and functionalities as described in reference to FIG. 1.

In an aspect of the disclosure, the method 200 may be provided for generating a finance-investment plan relative to one or more time intervals while maintaining a cash reserve at a predetermined threshold based on information related to one or more financial activities including asset related activities and liability related activities. For instance, the method 200 may be used for optimizing finance and investment with integrated risk management by handling loans (e.g., from a mortgage loan portfolio) and investments (e.g., from a flexible investment portfolio) to optimize business cash flow within a desirable range. Accordingly, the method 200 may be used to manage cash inflow (e.g., account receivables) and cash outflow (e.g., account payables) to account for periods of surplus cash reserves and/or insufficient cash reserves and to avoid missing investment opportunities and/or risking periods of non-operation.

In the example of FIG. 2, at 202, the method 200 may include retrieving information related to one or more assets from a database (e.g., the asset database 140) and evaluating accounts receivable (AR) patterns for each asset to determine cash surplus ranges within one or more time intervals. In an implementation, the method 200 may further include obtaining a plurality of forthcoming accounts receivable (AR) from the retrieved account information for each asset from the asset database 140.

At 204, the method 200 may include retrieving information related to one or more liabilities from another database (e.g., the liability database 142) and evaluating accounts payable (AP) patterns for each liability to determine cash flow gaps within the one or more time intervals. In an implementation, the method 200 may further include obtaining a plurality of forthcoming accounts payable (AP) from the retrieved account information for each liability from the liability database 142.

At 206, the method 200 may include maintaining an asset-to-liability ratio during the one or more time intervals. In an implementation, the method 200 may be used to determine when the asset-to-liability ratio changes and recalculate the asset-to-liability ratio when cash (i.e., working capital) is added from at least one of the assets to the cash reserve (i.e., working capital reserve) as revenue and/or when cash (i.e., working capital) is allocated to at least one of the liabilities from the cash reserve (i.e., working capital reserve) as payment.

At 208, the method 200 may use a genetic algorithm for generating one or more potential cash flow forecasting schemes for each asset and liability based on the accounts receivable patterns for each asset and the accounts payable patterns for each liability while maintaining the cash reserve at the predetermined threshold.

In another implementation, the method 200 may use the genetic algorithm for comparing a plurality of financial forecast chromosomes, wherein each financial forecast chromosome including the one or more potential cash flow forecasting schemes for each asset and liability within the one or more time intervals based on the accounts receivable patterns for each asset and the accounts payable patterns for each liability. The method 200 may use the genetic algorithm for comparing each of the plurality of financial forecast chromosomes relative to the predetermined threshold of the cash reserve, to thereby output a selected subset of the plurality of financial forecast chromosomes. The method 200 may use the genetic algorithm for combining financial forecast chromosomes of the selected subset of the plurality of financial forecast chromosomes to obtain a next generation of financial forecast chromosomes for output to the chromosome comparator and for subsequent comparison therewith of the next generation of financial forecast chromosomes with respect to the predetermined threshold of the cash reserve, as part of an evolutionary loop of the plurality of financial forecast chromosomes between the chromosome comparator and the chromosome combiner. In this instance, the method 200 may further include monitoring the evolutionary loop and selecting a selected financial forecast chromosome therefrom for implementation of the finance-investment plan based thereon.

In another implementation, the method 200 may use the genetic algorithm for combining the financial forecast chromosomes including selecting pairs of financial forecast chromosomes and crossing over portions of each pair of financial forecast chromosomes to obtain a child chromosome of the next generation.

In another implementation, the method 200 may use the genetic algorithm for wherein at least a portion of the evolutionary loop is executed using parallel processes in which each generation of financial forecast chromosomes is divided into sub-groups for parallel processing thereof. In this instance, the method 200 may further include selecting the selected financial forecast chromosome after a predetermined number of generations of the evolutionary loop, or after determining that the selected financial forecast chromosome satisfies the predetermined threshold of the cash reserve.

In the example of FIG. 2, at 210, the method 200 may include generating the finance-investment plan while maintaining the cash reserve at the predetermined threshold within the one or more time intervals based on the asset-to-liability ratio and the one or more potential cash flow forecasting schemes for each asset and liability.

In an implementation, the method 200 may further include generating the one or more potential cash flow forecasting schemes based on using investment portfolio information of each asset to determine the cash surplus ranges within the one or more time intervals while maintaining the cash reserve at the predetermined threshold In an implementation, the method 200 may further include generating the one or more potential cash flow forecasting schemes based on using loan portfolio information of each liability to determine the cash flow gaps within the one or more time intervals while maintaining the cash reserve at the predetermined threshold.

In an implementation, the method 200 may further include evaluating each potential cash flow forecasting scheme for each asset and liability and selecting a best potential cash flow forecasting scheme by considering one or more of the asset-to-liability ratio, the potential cash surplus ranges for each asset, and the potential cash flow gaps for each liability while maintaining the cash reserve at the predetermined threshold.

In the example of FIG. 2, the method 200 for managing resource allocation may be configured to recommend finance-investment plan that, for one, meets the cash reserve requirements, and two, maximizes any profits that may be received for AR based on a cash inflow estimation strategy for AR. Further, the cash reserve requirements may be defined with hard or soft conditions, and a scoring function may be defined by users to weight importance of each cash reserve requirement.

Figure 3:
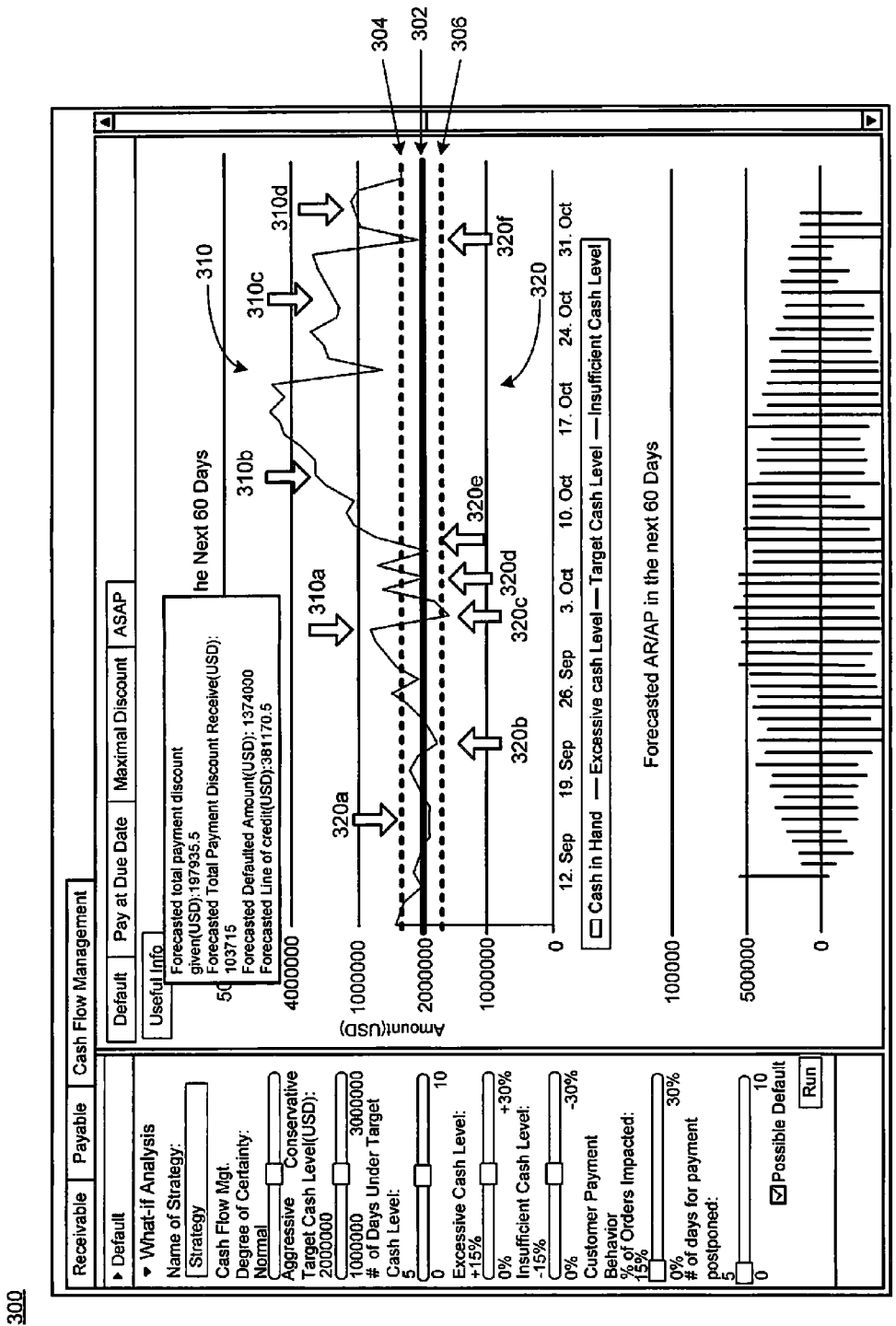
FIG. 3 is a screenshot of a graphical chart illustrating an example of cash flow management for finance-investment planning.
Figure 4:
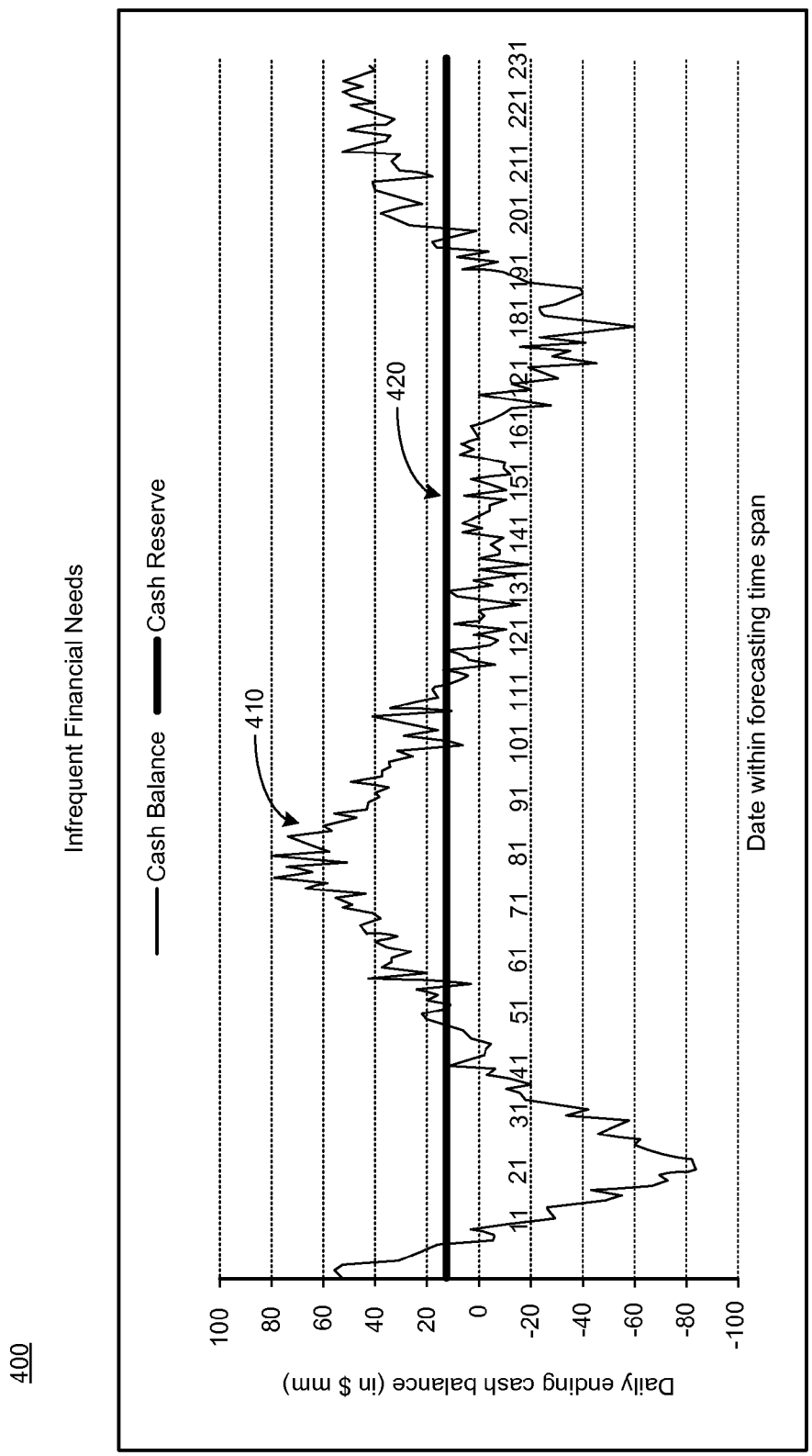
FIG. 4 is a screenshot of a graphical chart illustrating an example of cash flow for a business with infrequent financial needs related to business operations.
Figure 5:
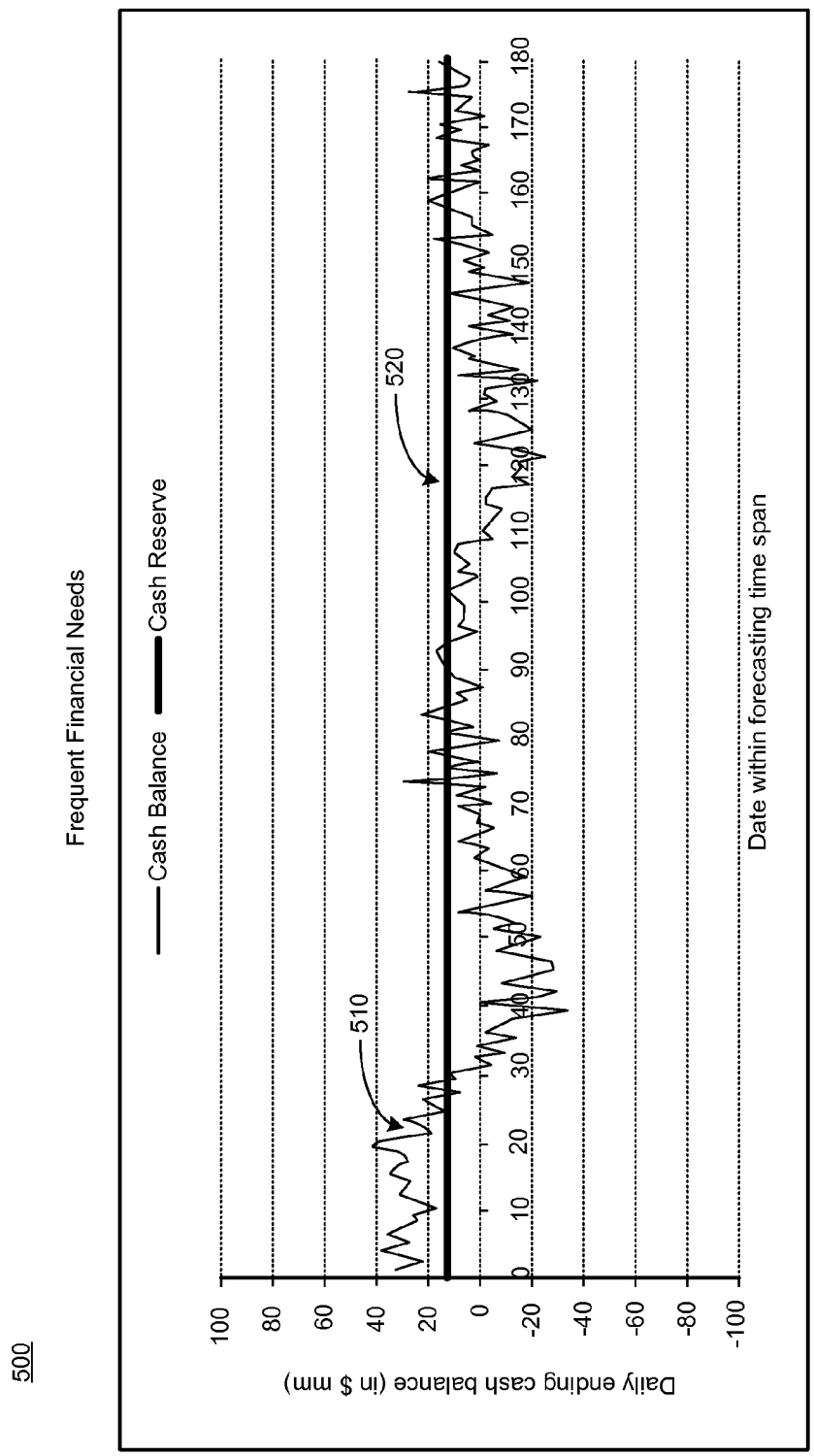
FIG. 5 is a screenshot of a graphical chart illustrating an example of cash flow for a business with frequent financial needs related to business operations.

FIG. 3 is a screenshot of a graphical chart 300 illustrating an example of cash flow management for finance-investment planning including loan requirements and investment opportunities. FIG. 3 further illustrates a cash reserve threshold including a target cash reserve level 302 interposed between an excessive cash reserve level 304 and an insufficient case reserve level 306. FIG. 4 is a graphical chart illustrating an example of daily cash flow forecasting for infrequent financial needs, and FIG. 5 is a graphical chart illustrating an example of daily cash flow forecasting for frequent financial needs.

In an aspect of the disclosure, the system 100 and method 200 provide for optimizing short-term financing and investment with integrated risk management. As provided herein, embodiments of the disclosure may be configured to derive an effective short-term financial and risk management system 100 and method 200 adapted for use by for businesses and enterprises. The system 100 and method 200 for optimizing short-term financing and investment with integrated risk management may be configured to handle queries from loan portfolios (e.g., including short-term mortgage loans) and flexible investment portfolios to optimize cash flow within a desirable range. As such, in a manner as provided herein, aspects of the disclosure are related to optimizing short-term financing and investment while managing and/or maintaining risk.

Referring to the graphical chart 300 of FIG. 3, the cash flow management system 100 and method 200 assists businesses and enterprises with managing cash inflow (e.g., accounts receivable) and cash outflow (e.g., accounts payable). As shown in the graphical chart 300 of FIG. 3, during normal business operations, there may be periods of cash flow surpluses 310 (e.g., excessive cash reserves) and/or periods of cash flow gaps 320 (e.g., insufficient cash reserves). In either scenario, business and enterprises may risk lost or missed investment opportunities during periods of cash flow surpluses 310 and/or may risk periods of non-operation and being unable to operate during periods of cash flow gaps 320.

In the example of the graphical chart 300 of FIG. 3, optimizing short-term financing and investment may be achieved with embodiments of the disclosure. For instance, as shown in FIG. 3, there are four periods 310*a*, 310*b*, 310*c*, 310*d* when short-term investment opportunities may exist and six periods 320*a*, 320*b*, 320*c*, 320*d*, 320*e*, 320*f* when short-term financing may be needed. For the six periods 320*a*, 320*b*, 320*c*, 320*d*, 320*e*, 320*f* when short-term financing may be needed, optimizing short-term financing may be achieved with at least one of the following options. For example, one short-term financing option may include selecting six loans that match the length of the six periods 320*a*, 320*b*, 320*c*, 320*d*, 320*e*, 320*f*. In another example, another short-term financing option may include selecting four loans to cover four periods 320*a*, 320*b*, 320*c* to 320*e*, 320*f*. In another example, another short-term financing option may include selecting three loans to cover three periods 320*a* to 320*b*, 320*c* to 320*e*, 320*f*.

Referring to the example of the graphical chart 300 of FIG. 3, optimizing short-term investment may be achieved during the four periods 310*a*, 310*b*, 310*c*, 310*d* when short-term investment opportunities may exist. For the four periods 310*a*, 310*b*, 310*c*, 310*d*, optimizing short-term investment opportunities may achieved with the following option. For example, one short-term investment option may include selecting four investment opportunities that match the length of the four periods 310a, 310b, 310c, 310d. In another example, another short-term investment option may include selecting three investment opportunities to cover three periods 310a, 310b to 310c, 310d. In another example, another short-term investment option may include selecting two investment opportunities to cover two periods 310a, 310b to 310d.

In an aspect of the disclosure, the complexity of optimizing short-term financing and investment may arise from when one loan is approved and cash is used, and the asset-to-liability ratio may change and such a change may impact the ability of acquiring another loan. As a result, loans may be considered together as a whole instead of being considered individually.

In another aspect of the disclosure, the complexity of optimizing short-term financing and investment may arise from a need to consider short-term financing and investment together given that each has an impact on the cash flow.

In another aspect of the disclosure, the complexity of optimizing short-term financing and investment may arise from risk management, such as maintaining the asset-to-liability ratio, which may need to be considered together as various related ratios may impact credit rating of a business or enterprise, and the ability to acquire a loan and/or interest rate.

FIGS. 4-5 show screenshots of graphical charts illustrating examples of cash flow for businesses with infrequent and frequent financial needs related to business operations. In particular, FIG. 4 is a screenshot of a graphical chart illustrating an example of cash flow for a business with infrequent financial needs related to business operations, and FIG. 5 is a screenshot of a graphical chart illustrating an example of cash flow for a business with frequent financial needs related to business operations.

In the context of a business or enterprise having a frequent need for a financing source, cash flow charts 400, 500, as shown in FIG. 4 and FIG. 5, respectively, may refer to two different categories, including, for example, infrequent and frequent financial needs. In the example of the cash flow chart 400 of FIG. 4, infrequent occasions may occur when a business or enterprise receives a limited number of large orders, and in the example of the cash flow chart 500 of FIG. 5, frequent occasions may occur when a large quantity of small orders are pending.

In the examples of FIGS. 4 and 5, the starting and ending cash reserve balances 410, 510 should be maintained above a predetermined level each day. As shown in the graphical charts 400, 500, the predetermined levels 420, 520 of the cash reserve, respectively, may be marked with a solid line. In an implementation, areas above the cash reserve threshold levels 410, 510 may be considered potential cash inflow surpluses for investment, and areas under the cash reserve threshold levels 410, 510 may be considered potential cash outflow gaps or insufficiencies to be closed or at least avoided. Based on historical data and future cash flow forecasting within a given time span or period, the system 100 and method 200 may be configured to increase investment portfolio returns, reduce potential cash gaps, decrease loan interest expenses, and/or minimize integrated financial risks. Further, in accordance with aspects of the disclosure, a plurality of finance-investment forecast schemes may be applied in the system 100 and method 200, including using a bank loan portfolio to cover cash flow gaps, investing cash surplus to increase revenues, and combining these two for optimization. These and various other related aspects are described in greater detail herein.

FIG. 6 is a block diagram illustrating an example of a hybrid parallel genetic algorithm (HPGA) framework 600 for use in resource allocation management and risk management. Input to the HPGA 600 may involve future cash flow forecasting for a business or enterprise within a time span (period) and a cash reserve.

In an implementation, the HPGA 600 may be introduced for a situation of short-term financing and investment situation with risks. Prior to a start of the evolution search algorithm, a Master-Slave GA model 610 on task assignment/scheduling to GA 610a, 610b, 610c, . . . , 610n on different threads, which may operate independently to each other, followed by a Coarse-Grained GA model on parallelism to process evolution (including crossover and mutation) within and between every generation.

In the example of FIG. 6, a GA based finance-investment planning process may include randomly generating a set of loan plans 620, verify and evaluate each plan in a current generation 622, and sort all valid plans and select a best plan to evolve 624. In addition, after each iteration in the current generation, decisions may be made to try and repair plans or abandon a current plan.

Further, in the example of FIG. 6, until a satisfactory fitness level has been reached or a maximum number of generations have been produced, the HPGA 600 may terminate to check if an optimal solution has been found, either to output the solution or to restart a new round of the HPGA 600. In an implementation, the HPGA 600 may merge all results from different threads 610a, 610b, 610c, . . . , 610n. If not converged, then the HPGA 600 may iterate the planning process, else return the best loan plan.

In an implementation, integrated financial risk management may entail statistical measurements like Altman Z-Score in various types for corporate financial performance evaluation, Sharpe Ratio, and Calmar Ratio for portfolio returns, Cash-Flow-at-Risk (CFaR) and Earnings-at-Risk (EaR) for cash flow running.

In an aspect of the disclosure, at least two scenarios may be considered, credit crunch and credit easing, for a capital market that may define an input for different finance-investment forecasting.

For instance, a credit crunch market may involve a sudden reduction in an availability of loans and a rise of interest rates, such as when lenders offer higher interest rates and borrowers allow the higher interest rates when searching for a loan. A small deviation may exist with interest rate distribution for lenders and borrowers, to thereby keep the market homogeneous. Further, in this event, lenders and investors may seek for less risky investments with lower yields.

In another instance, a credit easing may involve a rise in the availability of loans and a reduction of interest rates, such as when lenders offer lower interest rates and borrowers allow the lower rates when searching for a loan. A large deviation may exist with interest rate distribution for lenders and borrowers, to thereby provide some diversification and heterogeneity. Further, in this event, lenders and investors may intend to seek for risky and high-yield investments.

For each capital market scenario with future cash flow forecasting, multiple different finance-investment schemes may be applied. For example, only a bank loan may be considered to cover potential cash gaps, minimize risk, and lower interest expenses. In another example, only investment portfolio may be considered to cover potential cash gaps, reduce risk metrics, and increase profits. In another example, both bank loan and investment portfolio may be applied to cover potential cash gaps, control risk, and maximize expected cash returns.

In various implementations, for each capital market scenario with future cash flow forecasting, one or more of the following finance-investment schemes may be applied. For example, a first finance-investment forecast scheme may include a loan type scheme, wherein cash flow forecasting may be provided, and a bank loan may be used as an only outer fund source to cover potential cash gaps, minimize risk, and lower interest expenses. In another example, a second finance-investment forecast scheme may include an investment type scheme, wherein within a forecasting time span or period, an investment portfolio raised from a cash surplus may be used as the only fund source to cover potential cash gaps, reduce risk metrics, and increase profits. In another example, a third finance-investment forecast scheme may include an integrated type scheme, wherein future cash flow may be estimated, and both the bank loan and the investment portfolio are applied for fund source to cover potential cash gaps, control risk, and maximize expected cash returns. These and various other related aspects are described in greater detail herein.

Figure 7:
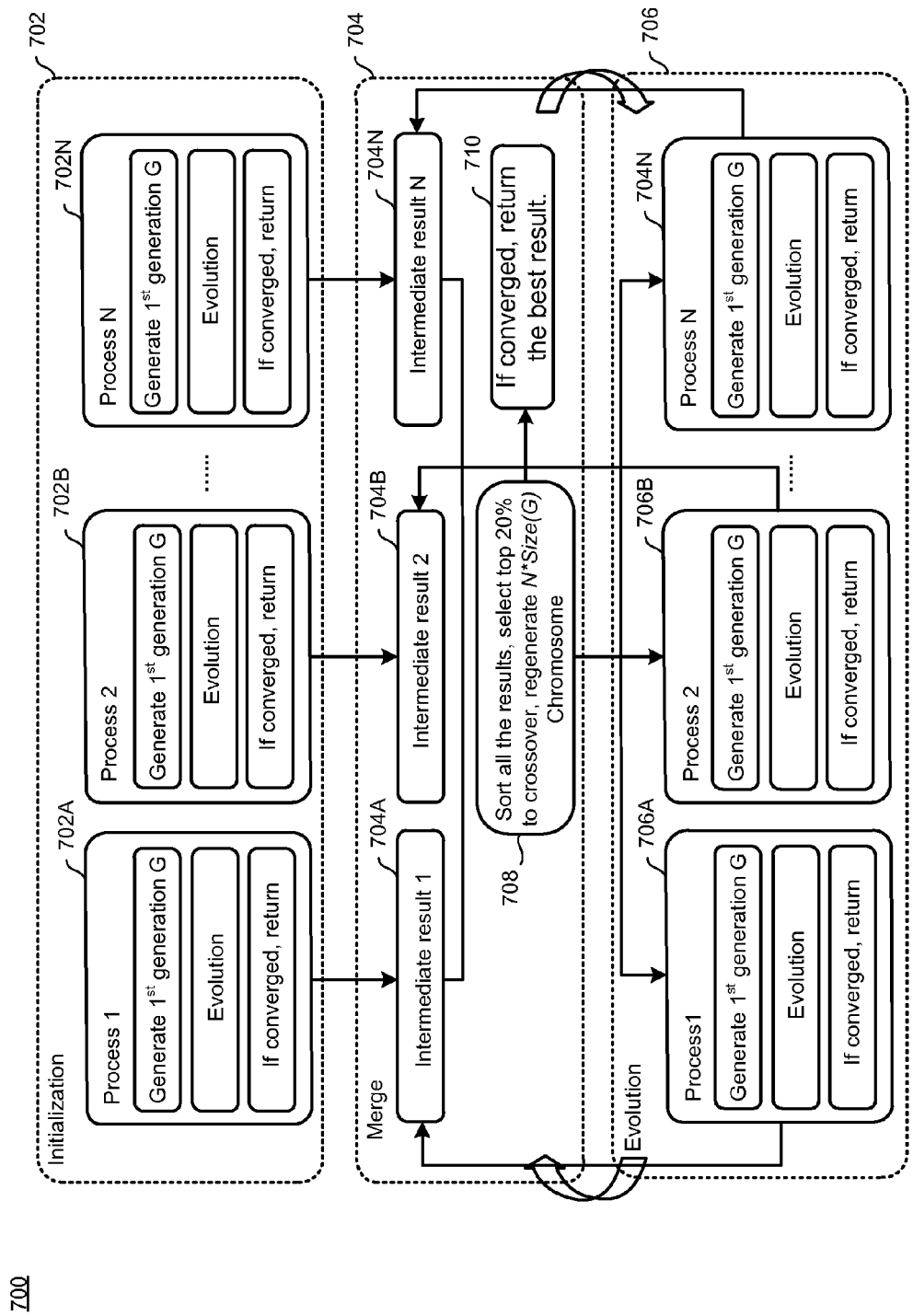
FIG. 7 is a block diagram illustrating an example framework for managing resources including cash reserves by implementing a genetic algorithm for finance-investment planning in a manner consistent with methods provided herein.

FIG. 7 is a block diagram illustrating an example framework 700 for managing resources including cash reserves by implementing a genetic algorithm for finance-investment planning in a manner consistent with methods provided herein. In an implementation, the framework 700 illustrates a parallel framework in which the various operations of the financial activity optimizer 128 and the genetic algorithm handler 130 may be parallelized to obtain faster, more efficient results.

In this regard, two, three, or more processors may be utilized to divide tasks of a larger computational task so as to obtain computational results in a faster, more efficient manner. Such parallelization may include division of subtasks to be executed in parallel among a specified number of processors, whereupon independent, parallel processing of the assigned subtasks may proceed, until such time as it may be necessary or desired to rejoin or otherwise combine results of the parallel threads of computation into a unified intermediate or final result for the computational task as a whole.

In this regard, it should be appreciated that such parallelization may be implemented using any multi-computing platform in which a plurality of processors, central processing units (CPUs), or other processing resources are available, including network/device clusters. For example, such parallel processing may utilize existing SMP/CMP (Symmetrical Multi-Processing/Chip-level Multi-Processing) servers. Thus, in the present description, it should be appreciated that the described processes may each be executed using such a corresponding unit(s) of processing power within any such environment in which multiple processing options are available. For example, it may be appreciated that the at least one processor 110 of FIG. 1 may be understood to represent any two or more of the above-referenced implementations for executing parallel processing, or other platforms for parallel processing, as would be apparent.

In the example of FIG. 7, an initialization stage 702 is illustrated in which "N" processes 702A, 702B, . . . 702N are illustrated. As illustrated, each process 702A-702N represents a separate instance of the above-described evolutionary loop of the genetic algorithm handler 130. Specifically, as shown in each of the processes 702A-702N, a generation "G" of chromosomes may be generated, whereupon evolution of subsequent generations of chromosomes may be conducted, until such time as if and when the financial activity optimizer 128 may identify a desired type and extent of convergence. As may be appreciated, the chromosome generations of the initial processes 702A-702N may be generated in random fashion. In other example implementations, the initial populations may be generated using one or more techniques designed to provide at least a high level of design which attempts to optimize associated schedules, or at least to eliminate inclusion of unworkable or otherwise undesirable potential schedules.

In a subsequent merge stage 704, intermediate results 704A, 704B . . . 704N may be combined, so that, in an operation 708, the combined results may be sorted, and the top 20% (or other designated portion) may be selected for use in creating a subsequent generation of chromosomes. Specifically, the selected portion of a current generation of chromosomes may be utilized to perform the types of crossovers described herein, or other known types of crossovers.

In the example of FIG. 7, individual pairs of chromosomes may be crossed over multiple times, for example, such that a subsequent generation of chromosomes includes N*size (G) chromosomes (i.e., includes a same number of chromosomes as a current generation). For instance, in the example of FIG. 7, since a top 20% of sorted chromosomes may be selected, each pair of chromosomes may be utilized to generate a plurality of new child chromosomes so as to maintain a same number of chromosomes in each generation.

If the overall operation is designated as having converged in conjunction with the operation 708, then the best result (i.e., the chromosome representing the best schedule according to the designated metric of profit maximum and/or utilization maximization) may be returned, as shown in operation 710. Otherwise, an evolution operation 706 may proceed with a re-parallelization of the new, child chromosome population generated in the operation 708.

Specifically, as shown, processes 706A, 706B . . . 706N may execute a new, current iteration of processing of the generated population chromosomes, in a manner that is substantially identical to the processes 702A, 702B . . . 702N with respect to the initialization operations 702. Subsequently, intermediate results 704A, 704B . . . 704N corresponding respectively to the processes 706A, 706B . . . 706N may be merged for subsequent sorting, crossover, and regeneration in the context of the operation 708. As may be appreciated, the operations 702, 704, 706 may proceed until convergence is reached at operation 710, and a best or best available result is obtained.

Figure 8:
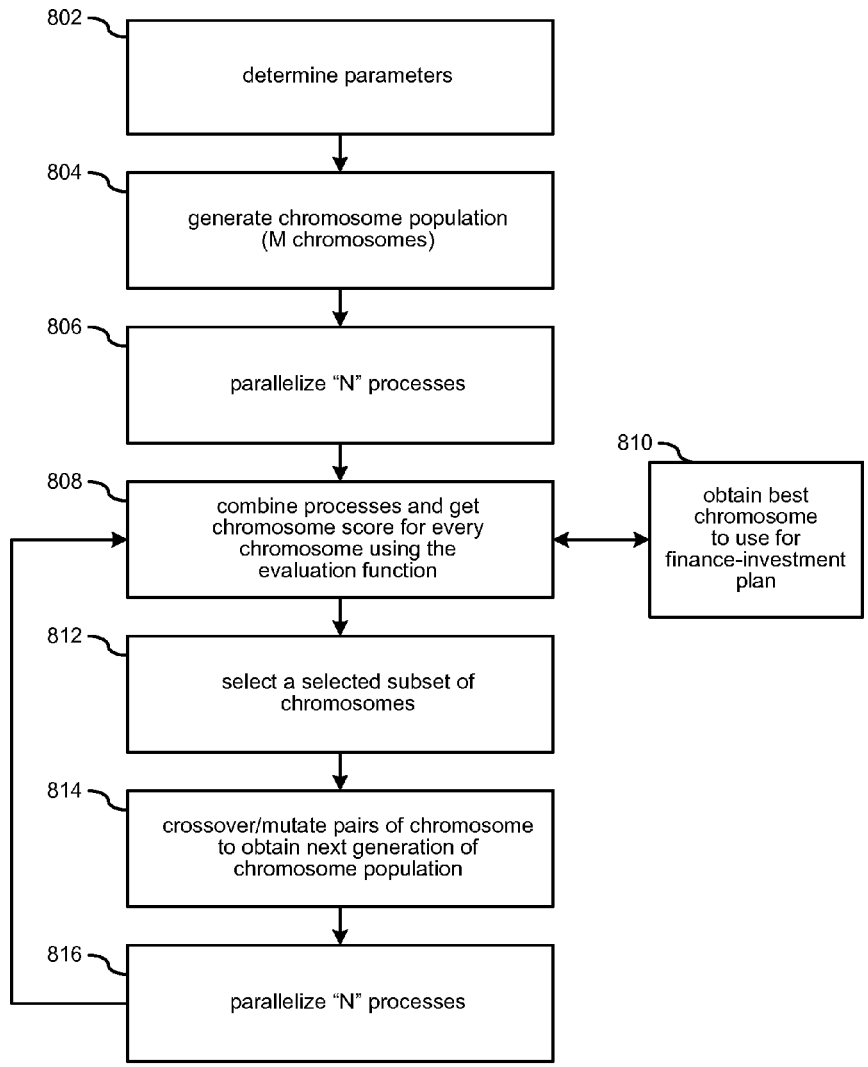
FIG. 8 is a process flow illustrating another example method for managing resources including cash reserves by implementing a genetic algorithm for finance-investment planning in a manner consistent with reference to the operations of the framework of FIG. 7.

FIG. 8 is a process flow illustrating another example method 800 for managing resources including cash reserves by implementing a genetic algorithm for finance-investment planning in a manner consistent with reference to the operations of the framework 700 of FIG. 7.

At 802, parameters may be determined. For example, parameters that characterize various portions of the chromosomes to be constructed and/or against which viability of the chromosomes may be judged, as well as a preferences received from a user for performing such judgments, (e.g., generating one or more potential cash flow forecasting schemes for each asset and liability based on the accounts receivable patterns for each asset and the accounts payable patterns for each liability while maintaining the cash reserve at the predetermined threshold), may be determined. For instance, as described, a user of the system 100 of FIG. 1 may utilize the GUI 152 to identify, designate, provide, or otherwise determine such information.

At 804, an initial chromosome population of "M" chromosomes may be generated. For example, the chromosome generator 128 may generate the first generation G of the processes 702A, 702B . . . 702N of FIG. 7.

At 806, "N" processes may be parallelized. For example, FIG. 7 illustrates an example of parallelization of "N" processes, e.g., in the initialization stage 702.

At 808, a chromosome score for every chromosome of the generation may be obtained by combining the various processes and using an appropriate evaluation function. For example, the chromosome comparator 134 may utilize such an evaluation function to associate a score with each chromosome of the generation. If convergence is reached according to one or more pre-determined criteria, then a best available financial forecast chromosome may be selected for use. For instance, if a chromosome receives a sufficiently high score, or if overall operations of the method 800 have provided a designated number of generations of chromosomes and/or have taken a designated total amount of time, then convergence may be understood to have occurred.

Otherwise, at 812, a selected subset of chromosomes may be selected. For example, the chromosome comparator 134 may select a top 20% of chromosomes as scored by the evaluation function.

At 814, pairs of the selected chromosomes may be subjected to crossovers and/or mutation to obtain a subsequent generation of chromosomes. For example, the chromosome combiner 136 may implement a type of crossover or combination in a manner as described herein.

At 816, parallelization of a subsequent "N" processes may proceed. For example, the chromosome comparator 134 may parallelize the end processes 706A, 706B . . . 706N as part of the evolution operation 706. In this way, a number of generations of chromosomes may be provided, until a suitable chromosome is obtained at 810.

FIGS. 9-11 are diagrams illustrating various chromosome presentations for finance-investment schemes. In particular, FIG. 9 is a diagram illustrating a chromosome presentation 900 for a loan type scheme, FIG. 10 is a diagram illustrating a chromosome presentation 1000 for an investment type scheme, and FIG. 11 is a diagram illustrating a chromosome presentation 1100 for an integrated type scheme.

In reference to the examples of FIGS. 9-11, chromosome and/or genome presentations (i.e., structures) for previously described scenarios, credit crunch and credit easing market, may be constructed as the same in a plurality of types, including short-term loan, short-term investment, and loan-investment integrated finance-investment scheme. In the two-dimensional structures of FIGS. 9-11, a total number of columns refers to days in a forecasting time span or period, which may include, for example, 7 for a week, 30 for a month, 90 for a quarter, or 365 for whole year.

FIG. 9 is a diagram illustrating the chromosome presentation or structure 900 for the loan type finance-investment forecast scheme, wherein cash flow forecasting may be provided, and a bank loan may be used as an only outer fund source to cover potential cash gaps, minimize risk, and lower interest expenses. For example, a bank loan may be used as the only outer fund source, wherein the chromosome 900 may be presented as shown in FIG. 9. In this example, each column may refer to a daily loan application, while each row refers to contents of a loan, the length, daily loan taken status, the name (lender and loan type), and amount of cash. For any short-term loan, the following constraints should be satisfied: cash balance should be maintained to be above the cash reserve, and a total loan amount should be within budget.

FIG. 10 is a diagram illustrating the chromosome presentation or structure 1000 for the investment type finance-investment forecast scheme, wherein within a forecasting time span or period, an investment portfolio raised from a cash surplus may be used as the only fund source to cover potential cash gaps, reduce risk metrics, and increase profits. For example, short-term investment may be used as the only fund source, wherein the chromosome 1000 may be presented as shown in FIG. 10. In this example, each column may refer to a daily investment, while each row refers to contents of an investment, the length, daily asset applied status, the name (asset name), and amount of cash. For any short-term investment, the following constraints should be satisfied: cash balance should be above cash reserve, no short-selling instances in any portfolio, and total investment amount should be within cash surplus.

FIG. 11 is a diagram illustrating the chromosome presentation or structure 1100 for the integrated type finance-investment forecast scheme, wherein future cash flow may be estimated, and both the bank loan and the investment portfolio may be used for the fund source to cover potential cash gaps, control risk, and maximize expected cash returns. For example, short-term loan and investment may be applied simultaneously, wherein the chromosome 1100 may be presented as shown in FIG. 11. In this example, each column may refer to a daily loan and/or investment, while each row may refer to contents of the financial activity, the length, daily activity applied status, the name (loan or asset name), and amount of cash involved. For any short-term investment, the following constraints should be satisfied: cash balance should be maintained to be above cash reserve, total loan amount should be within budget, no short-selling instances in any portfolio, and total investment amount should be within cash surplus.

The hybrid parallel genetic algorithm (HPGA) for the system 100 and method 200 is described herein in reference to the following pseudo code for use in resource allocation management and risk management.

In reference to FIG. 6, the HPGA may include at least one of a Master-Slave GA and a Coarse-Grained GA model. Framework for the HPGA is shown in Algorithm 1. Following is the pseudo-code for HPGA search, where variable t refers to the current generation and P(t) the population at that generation. The algorithm then applies genetic operators, such as mutation and crossover, to evolve the solutions to find the best one(s).

Algorithm 1: Hybrid Parallel Genetic Search Algorithm

```
1.  FUNCTION Parallel Genetic algorithm
2.  BEGIN
3.  Time t
4.  Population P(t):= new random Population
5.    WHILE not done DO
6.      assign P(t) to N processes evenly
7.      Run on each Process p in parallel:
8.        evolve(P(t))
9.        evaluate(P(t))
10.   END WHILE
11.   select the best P(t+1) from P(t)
12.   t := t + 1
13.   END FOR
14. END
```

In each generation, randomly generated individuals are evaluated by the problem dependent fitness function, short-term loan method, short-term investment method, and integration of loan and investment method separately. The algorithm may be prone to choose individuals with higher fitness score to create next generation. Capital markets of credit crunch and credit easing may be divided by mean borrower standard deviation: lower value for crunch and higher for easing.

In reference to Table 1, a loan evaluation function may be configured to provide various Z-score related loan score for a given loan portfolio, as corporate financial health measurement. Z-score lower than 1.81 indicates the company will be in distress zone under the proposed loan. Financial ratios below constructed the Z-Score formula, which are Key Performance Indicators (KPI) in company financial statements.

TABLE 1

Financial Ratios in Z-Score Formula

| Ratios | Ratio Calculating Formula | Expected Sign |
|---|---|---|
| $X_1$ (working capital to total assets) | working capital/total assets<br>working capital = current asset − current liabilities | + |
| $X_2$ (retained earnings to total assets) | retained earnings/total assets<br>retained earnings = earned surplus + retained profits | + |
| $X_3$ (ROI) | EBIT/total assets<br>EBIT = net profit + taxes + financial expenditure | + |
| $X_4$ (trading shares liability ratio) | market value of trading shares/total liabilities | + |
| $X_5$ (assets turnover) | sales/total assets | + |
| $X_6$ (asset-liability ratio) | total liabilities/total assets | − |
| $X_7$ (ROA) | net profit/average total assets | + |

The score may be largely dependent on interest expenses of the loan, which should be minimized. In reference to Algorithm 2, feasibility of loan application may be considered here, determined by loan pairs, amount of loan, and credit ratings.

---

Algorithm 2: GA Evaluation Function for Loan

1: FUNCTION evaluate loan
2: IN: CHROMOSOME, a representation of the loan portfolio collection
3: IN: CASH FLOW FORECASTING, a forecasting for daily cash flow balance for a certain time span based on historical data, also in monthly/quarterly/yearly formats
4: IN: BALANCE SHEET, INCOME STATEMENT, CASH FLOW STATEMENT, corporate financial statements or annual reports for public/listed company
5: IN: $\sigma_{loan}$, the standard deviation of loan interest rate, decided by credit crunch/credit easing market
6: OUT: loanscore, the score of the loan portfolio indicated by CHROMOSOME
7: BEGIN
8:
9: for (each day d ∈ cash flow forecasting time span)
10:    if (takeLoan[d] = TRUE) then
11:       cashBalance[d] += loanAllocation[d]
12:    endif
13:    if (cashBalance[d] < 0) then
14:       cashGapDays++
15:    endif
16: end for
17: for (each applied loan ∈ loan portfolio)
18:    sum up total interest expenses
19: end for
20: compute Z-Score estimated, Z-Score type determined by company type (public MFG/privately held MFG/non-MFG/China Companies)
21: compute feasibility f of loan portfolio between all loan-pairs
22:
23: $$\text{loanscore} := \frac{(\text{ainterest} + \beta z - \text{Score})}{\sqrt{\text{cashGapDays}}} \sigma_{loan} f$$
24: return loanscore
25: END

---

In reference to Algorithm 3, an investment evaluation function may be configured to compute an investment score related to risk-return measurement. For instance, in yearly return and sometimes traditionally, a degree of investment portfolio concentration may be important when evaluating an investment portfolio. In various implementations, performance measurements may include Sharpe Ratio for how much portfolio returns fluctuate over a given period, and Calmar Ratio for ratio of excess annualized returns over maximum drawdown. In an implementation, Algorithm 3 may appreciate a higher score for selection.

---

Algorithm 3: GA Evaluation Function for Investment

1: FUNCTION evaluate investment
2: IN: CHROMOSOME, a representation of the investment portfolio allocation
3: IN: CASH FLOW FORECASTING, a forecasting for daily cash flow balance
4: IN: BALANCE SHEET, INCOME STATEMENT, CASH FLOW STATEMENT
5: IN: REALIZED VOLATILITY for each asset
6: IN: H, the number of assets in the portfolio
7: IN: $\sigma_{invest}$, the standard deviation of asset investment return, decided by credit crunch/credit easing market
8: OUT: investmentscore, the score of the investment portfolio indicated by CHROMOSOME
9: BEGIN
10: risk := REALIZED VOLATILITY
11: Concentration := 1/H
12: for (each day d ∈ cash flow forecasting time span)
13:    if (ifInvest[d] = TRUE) then
14:       cashBalance[d] −= amountOfInvest[d]
15:    endif
16:    if (cashBalance[d] < 0) then
17:       cashGapDays++
18:    endif
19: end for
20: for (each applied asset ∈ investment portfolio)
21:    sum up total portfolio returns
22: end for

| Algorithm 3: GA Evaluation Function for Investment |
| --- |
| 23: compute SharpeRatio SR and CalmarRatio CR, to measure portfolio performance |
| 24: investmentscore := |
| $\sigma_{invest}[\eta \cdot \text{returns} + \text{Concentration} \cdot \log(\delta \text{SharpeRation} + \lambda \text{CalmarRatio})]$ |
| 25: return investmentscore |
| 26: END |

In some instances, bank loans and investment portfolios may be involved in short-term financing for business operations. Integrated finance-investment schemes may be configured to combine the previous two and provide a combined score. In some example, classic Value-at-Risk (VaR) may be considered inappropriate for non-financial companies, and therefore, the system and methods of the disclosure may implement Cash-Flow-at-Risk (CFaR) and Earnings-at-Risk (EaR) as alternatives.

In reference to Algorithm 4, cash flow may be classified individually for decision and operating scenarios for financing and investment. For instance, every day, a starting and ending cash balance may be used to calculate CFaR and EaR values, indicating changes under certain (e.g., 95%) confidence. A higher integrated score may provide better performance of the finance and investment portfolio.

| Algorithm 4: GA Evaluation Function for integrated Loan and Investment |
| --- |
| 1: FUNCTION evaluate combined portfolio |
| 2: IN: CHROMOSOME, a representation of the loan and investment portfolio |
| 3: IN: REALIZED VOLATILITY for each asset |
| 4: IN: H, the number of assets in the portfolio |
| 5: IN: $\sigma_{loan}$, the standard deviation of loan interest rate, decided by credit crunch/credit easing market |
| 6: IN: $\sigma_{invest}$, the standard deviation of asset investment return, decided by credit crunch/credit easing market |
| 7: |
| 8: OUT: integratedscore, the score of the combined loan and investment portfolio indicated by CHROMOSOME, with Cash-flow-at-risk and Earnings-at-Risk methods |
| 9: BEGIN |
| 10: for (each day d ∈ cash flow forecasting time span) |
| 11:   if (takeLoan[d] = TRUE) then |
| 12:     cashBalance[d] += amountOfLoan[d] |
| 13:   if (ifInvest[d] = TRUE) then |
| 14:     cashBalance[d] -= amountOfInvest[d] |
| 15:   endif |
| 16:   if (cashBalance[d] < 0) then |
| 17:     cashGapDays++ |
| 18:   endif |
| 19: end for |
| 20: for (each applied loan ∈ loan portfolio) |
| 21:   sum up total interest expenses |
| 22: end for |
| 23: for (each applied asset ∈ investment portfolio) |
| 24:   sum up total portfolio returns |
| 25: end for |
| 26: decisioncashflow := returns − interest |
| 27: compute daily CFaR and EaR on a two-sided confidence interval |
| 28: |
| 29: integratedscore := |
| $\sigma_{loan} \cdot \sigma_{invest}\left[\rho \sum_d \left(\frac{\text{decisioncashflow} + \text{operatingcashflow}}{CFaR}\right) + \omega \sum_d \cdot \text{decisioncashflow}\right]$ |
| 30: return integratedscore |
| 31: END |

Figure 12:
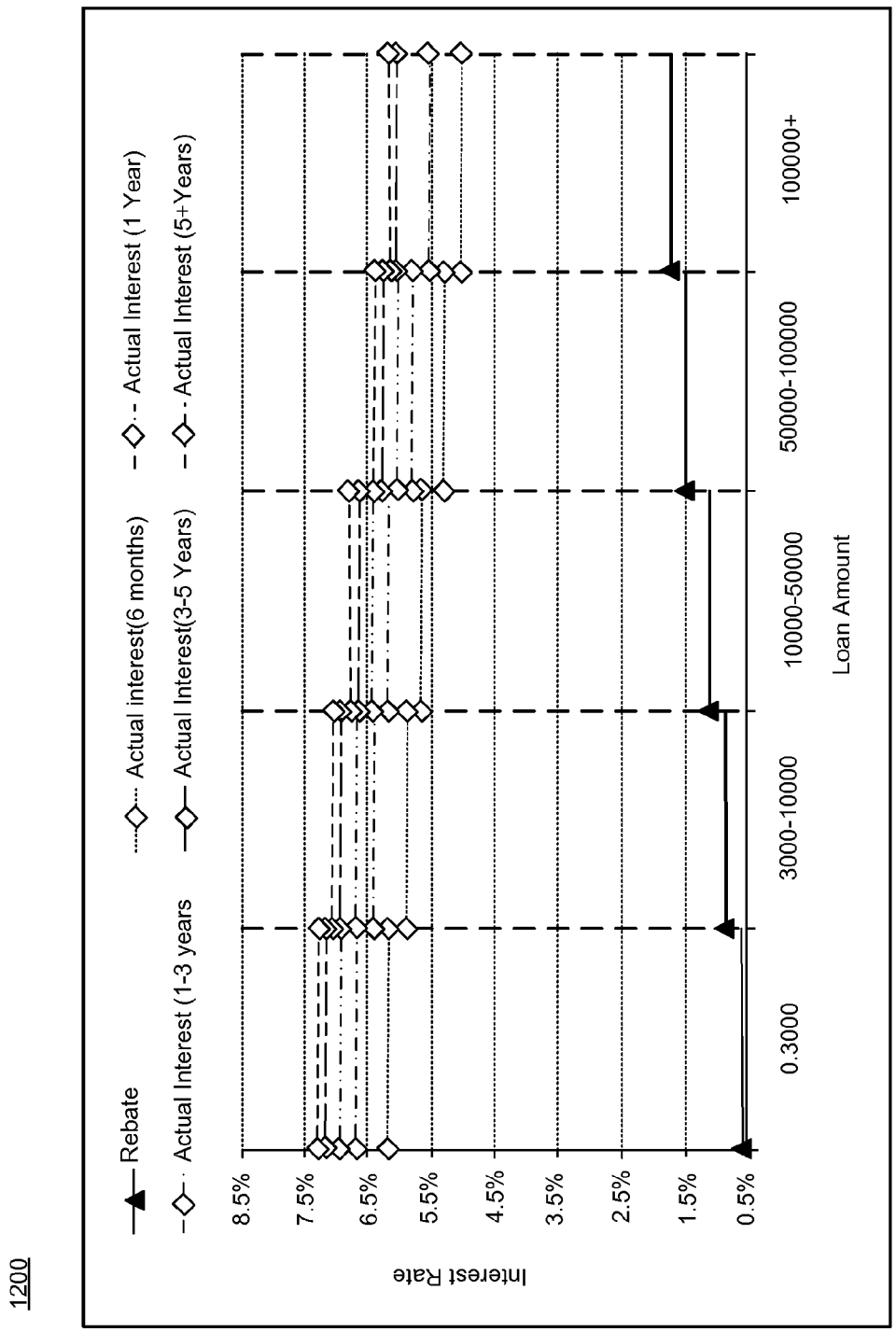
FIG. 12 is a screenshot of a graphical chart illustrating an example of rebate zones for interest rates, in accordance with aspects of the disclosure.
Figure 13:
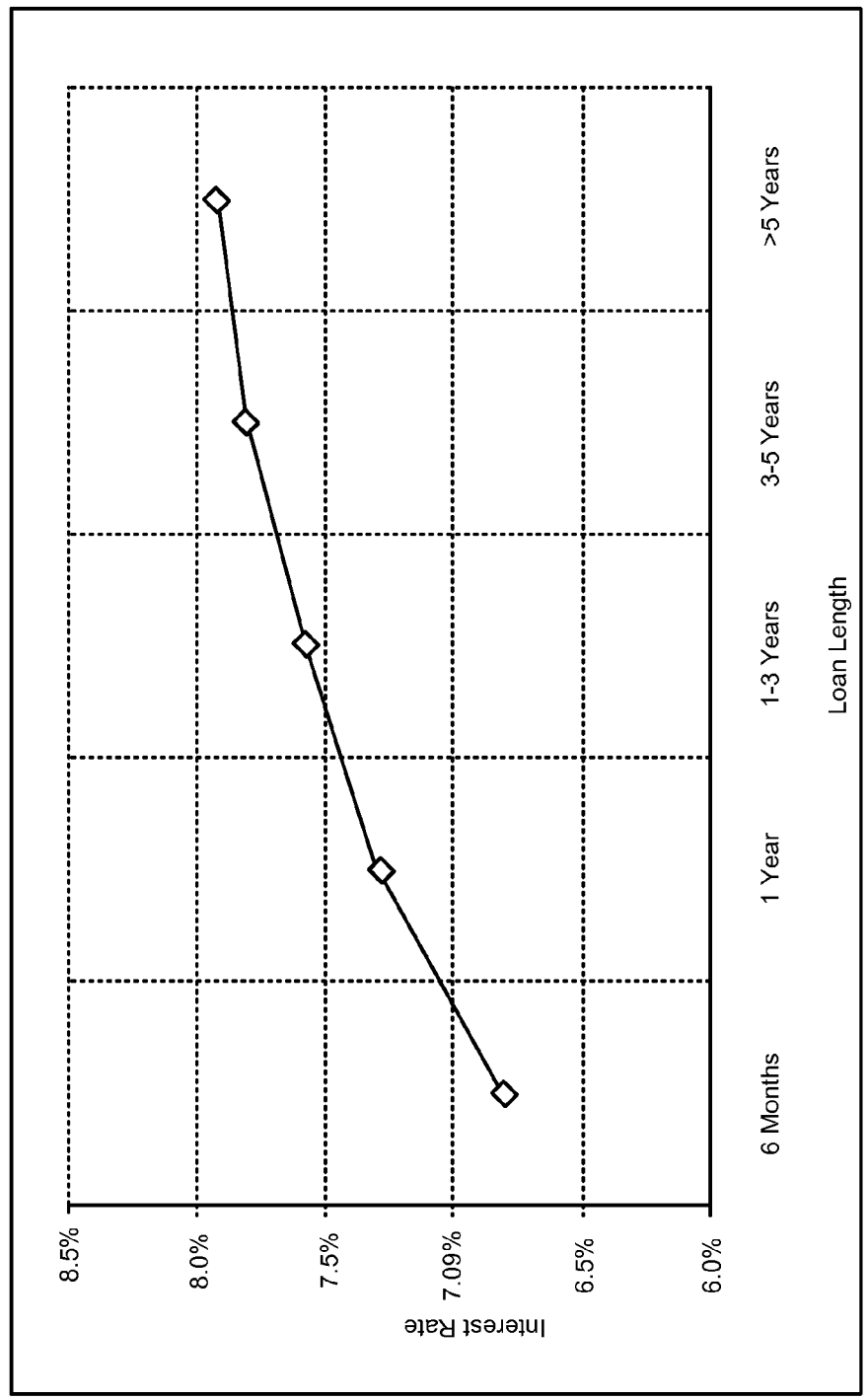
FIG. 13 is a screenshot of a graphical chart illustrating an example of interest rate versus loan term, in accordance with aspects of the disclosure.

FIG. 12 is a screenshot of a graphical chart illustrating an example of rebate zones for interest rates, in accordance with aspects of the disclosure. FIG. 13 is a screenshot of a graphical chart illustrating an example of interest rate versus loan term, in accordance with aspects of the disclosure.

Commercial loan interest rate may be determined by multiple factors, such, for example, loan term and loan amount. For example, borrowers may be rewarded by applying for long terms and large loans, in the form of an interest rebate, cash back, or other promotions from lenders. Interest rebate for loan may be considered with a 6-month loan term. For instance, rebate zones for interest rates may be set by level as provided in FIG. 12, which shows a graphical chart 1200 illustrating interest rates with rebate versus amount. Further, lenders may offer different interest rates for different loan product, and the price rises with loan term due to credit risk. FIG. 13 shows a graphical chart 1300 illustrating interest rate versus loan term. Interest rates for different credit scores may be added as floating value within small range of 10%-15%.

In an aspect of the disclosure, investment data may include various types of assets that may form an asset pool, descending ranked by yearly return as follows. For instance, an equities class may refer to individual company stocks or shares of a stock mutual fund, a fixed income class may refer to any type of bond or certificates of deposit, and a cash class may refer to money in high interest savings. Various different time spans or periods may be considered, corresponding to different regimes, to ensure robustness of results over time.

In reference to market credit parameters and to cater to various types of settings, the following parameters of Table 2 stood out as relevant.

TABLE 2

Detailed Scenario Parameter Settings

| Parameter | Description | Scenario Credit Crunch | Scenario Credit Easing |
| --- | --- | --- | --- |
| $\sigma_{loan}$ | standard deviation of loan interest rate | 1.00% | 5.00% |
| $\sigma_{invest}$ | standard deviation of asset investment return | 2.00% | 7.00% |
| $R_{loan}$ | risk threshold for loan feasibility | 0.10 | 0.50 |
| $R_{invest}$ | risk threshold for investment | 0.40 | 0.20 |

The scenarios are used as background for the experiments conducted, and allowed to understand how the different strategies and settings behaved under different environment conditions. At time t, a window of past returns of length T weeks may be chosen, denoted as $W_t$. At a given time t, a window stretching from t-T to t. $W_t$ is a T*m matrix of weekly returns for m assets in the investment universe may be considered. In testing, reallocation of assets and short-selling instances were excluded, and as a result, no excessive transaction costs were included.

For cash flow, budgeted Earnings Before Interest, Taxes, Depreciation, and Amortization (EBITDA) may be applied for stress testing. The experiment may cover samples under 99.9% confidence, denoted worst CFar of public companies in the past ten years. Further, the difference between experiment results and baseline before the test may be computed.

| Performance Measures | | |
|---|---|---|
| Ratios | Ratio Calculating Formula | Expected Value |
| Cash Gap Coverage Degree | covered cash gap days/total cash gap days | 100% |
| Annual Expected Return | (final total cash return/days in period)*days in a year | >0 |
| Sharpe Ratio | (expected portfolio return − risk free rate)/portfolio standard deviation | >0 |
| Calmar Ratio | compound annual return/maximum drawdown | >0 |

In various implementations, alternate types of schemes for comparison may include Greedy Algorithm, Simulated Annealing, and Stochastic Programming. It should be appreciated that some solutions may be based on Greedy Algorithms that may only achieve local optimization, instead of achieving global optimization via a broader search space, in a manner as provided herein according to aspects of the disclosure.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, may be written in any form of programming language, including compiled or interpreted languages, and may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data.

Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for user interaction, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other types of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of networks, such as communication networks, may include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system comprising:
at least one processor and memory; and
a resource allocation manager stored in memory and configured to cause the at least one processor to generate a finance-investment plan relative to one or more time intervals while maintaining a cash reserve at a predetermined threshold based on information related to one or more financial activities including asset related activities and liability related activities and store the finance-investment plan in the memory, the resource allocation manager including:
an asset handler configured to retrieve information related to one or more assets from an asset database and evaluate accounts receivable patterns for each asset to determine cash surplus ranges within the one or more time intervals;
a liability handler configured to retrieve information related to one or more liabilities from a liability database and evaluate accounts payable patterns for each liability to determine cash flow gaps within the one or more time intervals;
a risk handler configured to determine and maintain an asset-to-liability ratio related to the determined cash surplus ranges and the determined cash flow gaps during the one or more time intervals;

a genetic algorithm handler configured to generate one or more potential cash flow forecasting schemes for each asset and liability based on the accounts receivable patterns for each asset and the accounts payable patterns for each liability while maintaining the cash reserve at the predetermined threshold; and a financial activity optimizer configured to generate the finance-investment plan while maintaining the cash reserve at the predetermined threshold within the one or more time intervals based on the asset-to-liability ratio and the one or more potential cash flow forecasting schemes for each asset and liability.

2. The system of claim 1, wherein the information related to the one or more financial activities includes data related to the one or more financial activities including historical data and future cash flow forecasting data.

3. The system of claim 1, wherein the information related to the one or more assets includes investment portfolio data related to the one or more assets including historical data and future cash flow forecasting data.

4. The system of claim 1, wherein the information related to the one or more liabilities includes loan portfolio data related to the one or more liabilities including historical data and future cash flow forecasting data.

5. The system of claim 1, wherein the risk handler is further configured to determine when the asset-to-liability ratio changes and recalculate the asset-to-liability ratio when cash is added from at least one of the assets to the cash reserve as revenue and when cash is allocated to at least one of the liabilities from the cash reserve as payment.

6. The system of claim 1, wherein:
each of the assets is related to an investment including a short-term investment providing revenue as cash inflow to the cash reserve, and
each of the potential cash flow forecasting schemes are generated to determine potential cash surplus ranges for each asset and potential increases in revenue for each asset.

7. The system of claim 1, wherein:
each of the liabilities is related to a loan including a short-term loan requesting payment as cash outflow from the cash reserve, and
each of the potential cash flow forecasting schemes are generated to determine potential cash flow gaps for each liability and potential loan interest expenses for each liability.

8. The system of claim 1, wherein the genetic algorithm handler is configured to:
generate the one or more potential cash flow forecasting schemes based on using investment portfolio information of each asset to determine the cash surplus ranges within the one or more time intervals while maintaining the cash reserve at the predetermined threshold.

9. The system of claim 1, wherein the genetic algorithm handler is configured to:
generate the one or more potential cash flow forecasting schemes based on using loan portfolio information of each liability to determine the cash flow gaps within the one or more time intervals while maintaining the cash reserve at the predetermined threshold.

10. The system of claim 1, wherein the financial activity optimizer is configured to:
evaluate each potential cash flow forecasting scheme for each asset and liability; and select a best potential cash flow forecasting scheme by considering one or more of the asset-to-liability ratio, the potential cash surplus ranges for each asset, and the potential cash flow gaps for each liability while maintaining the cash reserve at the predetermined threshold.

11. The system of claim 1, wherein the genetic algorithm handler comprises:
a chromosome comparator configured to compare a plurality of financial forecast chromosomes, each financial forecast chromosome including the one or more potential cash flow forecasting schemes for each asset and liability within the one or more time intervals based on the accounts receivable patterns for each asset and the accounts payable patterns for each liability, and configured to compare each of the plurality of financial forecast chromosomes relative to the predetermined threshold of the cash reserve, to thereby output a selected subset of the plurality of financial forecast chromosomes; and a chromosome combiner configured to combine financial forecast chromosomes of the selected subset of the plurality of financial forecast chromosomes to obtain a next generation of financial forecast chromosomes for output to the chromosome comparator and for subsequent comparison therewith of the next generation of financial forecast chromosomes with respect to the predetermined threshold of the cash reserve, as part of an evolutionary loop of the plurality of financial forecast chromosomes between the chromosome comparator and the chromosome combiner, wherein the financial activity optimizer is further configured to monitor the evolutionary loop and select a selected financial forecast chromosome therefrom for implementation of the finance-investment plan based thereon.

12. The system of claim 11, wherein the chromosome combiner is further configured to combine the financial forecast chromosomes including selecting pairs of financial forecast chromosomes and crossing over portions of each pair of financial forecast chromosomes to obtain a child chromosome of the next generation.

13. The system of claim 11, wherein at least a portion of the evolutionary loop is executed using parallel processes in which each generation of financial forecast chromosomes is divided into sub-groups for parallel processing thereof.

14. The system of claim 11, wherein the financial activity optimizer is further configured to select the selected financial forecast chromosome after a predetermined number of generations of the evolutionary loop, or after determining that the selected financial forecast chromosome satisfies the predetermined threshold of the cash reserve.

15. A computer-implemented method performed by at least one processor of a computing device, the method comprising:
generating, by the at least one processor, a finance-investment plan relative to one or more time intervals while maintaining a cash reserve at a predetermined threshold based on information related to one or more financial activities including asset related activities and liability related activities including:
retrieving information related to one or more assets from an asset database and evaluating accounts receivable patterns for each asset to determine cash surplus ranges within the one or more time intervals;
retrieving information related to one or more liabilities from a liability database and evaluating accounts payable patterns for each liability to determine cash flow gaps within the one or more time intervals;

determining and maintaining an asset-to-liability ratio related to the determined cash surplus ranges and the determined cash flow gaps during the one or more time intervals;

generating one or more potential cash flow forecasting schemes for each asset and liability based on the accounts receivable patterns for each asset and the accounts payable patterns for each liability while maintaining the cash reserve at the predetermined threshold;

generating the finance-investment plan while maintaining the cash reserve at the predetermined threshold within the one or more time intervals based on the asset-to-liability ratio and the one or more potential cash flow forecasting schemes for each asset and liability; and storing the finance-investment plan in memory.

16. The method of claim 15, further comprising:

comparing a plurality of financial forecast chromosomes, each financial forecast chromosome including the one or more potential cash flow forecasting schemes for each asset and liability within the one or more time intervals based on the accounts receivable patterns for each asset and the accounts payable patterns for each liability;

comparing each of the plurality of financial forecast chromosomes relative to the predetermined threshold of the cash reserve, to thereby output a selected subset of the plurality of financial forecast chromosomes;

combining financial forecast chromosomes of the selected subset of the plurality of financial forecast chromosomes to obtain a next generation of financial forecast chromosomes for output and for subsequent comparison therewith of the next generation of financial forecast chromosomes with respect to the predetermined threshold of the cash reserve, as part of an evolutionary loop of the plurality of financial forecast chromosomes; and monitoring the evolutionary loop and selecting a selected financial forecast chromosome therefrom for implementation of the finance-investment plan based thereon.

17. The method of claim 16, further comprising:

combining the financial forecast chromosomes including selecting pairs of financial forecast chromosomes and crossing over portions of each pair of financial forecast chromosomes to obtain a child chromosome of the next generation, wherein at least a portion of the evolutionary loop is executed using parallel processes in which each generation of financial forecast chromosomes is divided into sub-groups for parallel processing thereof.

18. A computer program product, the computer program product being tangibly embodied on a non-transitory computer-readable storage medium and comprising instructions that, when executed by at least one processor, are configured to:

generate, by the at least one processor, a finance-investment plan relative to one or more time intervals while maintaining a cash reserve at a predetermined threshold based on information related to one or more financial activities including asset related activities and liability related activities, the instructions, when executed by the at least one processor, are further configured to:

retrieve information related to one or more assets from an asset database and evaluate accounts receivable patterns for each asset to determine cash surplus ranges within the one or more time intervals;

retrieve information related to one or more liabilities from a liability database and evaluate accounts payable patterns for each liability to determine cash flow gaps within the one or more time intervals;

determine and maintain an asset-to-liability ratio related to the determined cash surplus ranges and the determined cash flow gaps during the one or more time intervals;

generate one or more potential cash flow forecasting schemes for each asset and liability based on the accounts receivable patterns for each asset and the accounts payable patterns for each liability while maintaining the cash reserve at the predetermined threshold;

generate the finance-investment plan while maintaining the cash reserve at the predetermined threshold within the one or more time intervals based on the asset-to-liability ratio and the one or more potential cash flow forecasting schemes for each asset and liability; and store the finance-investment plan in memory.

19. The computer program product of claim 18, further comprising instructions that, when executed by the processor, are configured to:

compare a plurality of financial forecast chromosomes, each financial forecast chromosome including the one or more potential cash flow forecasting schemes for each asset and liability within the one or more time intervals based on the accounts receivable patterns for each asset and the accounts payable patterns for each liability;

compare each of the plurality of financial forecast chromosomes relative to the predetermined threshold of the cash reserve, to thereby output a selected subset of the plurality of financial forecast chromosomes;

combine financial forecast chromosomes of the selected subset of the plurality of financial forecast chromosomes to obtain a next generation of financial forecast chromosomes for output to the chromosome comparator and for subsequent comparison therewith of the next generation of financial forecast chromosomes with respect to the predetermined threshold of the cash reserve, as part of an evolutionary loop of the plurality of financial forecast chromosomes between the chromosome comparator and the chromosome combiner; and monitor the evolutionary loop and select a selected financial forecast chromosome therefrom for implementation of the finance-investment plan based thereon.

20. The computer program product of claim 19, further comprising instructions that, when executed by the processor, are configured to:

combine the financial forecast chromosomes including selecting pairs of financial forecast chromosomes and crossing over portions of each pair of financial forecast chromosomes to obtain a child chromosome of the next generation, wherein at least a portion of the evolutionary loop is executed using parallel processes in which each generation of financial forecast chromosomes is divided into sub-groups for parallel processing thereof.

* * * * *